United States Patent
Hawkins et al.

(10) Patent No.: US 9,860,363 B2
(45) Date of Patent: Jan. 2, 2018

(54) METHOD AND APPARATUS FOR ACCESSING A CONTACTS DATABASE AND TELEPHONE SERVICES

(71) Applicant: HEWLETT-PACKARD DEVELOPMENT COMPANY, L.P., Houston, TX (US)

(72) Inventors: Jeffrey Hawkins, Sunnyvale, CA (US); Robert Haitani, Menlo Park, CA (US); Mark Davis, Mill Valley, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 145 days.

(21) Appl. No.: 14/855,887

(22) Filed: Sep. 16, 2015

(65) Prior Publication Data
US 2016/0006853 A1    Jan. 7, 2016

Related U.S. Application Data

(63) Continuation of application No. 11/202,408, filed on Aug. 10, 2005, now Pat. No. 9,167,073, which is a
(Continued)

(51) Int. Cl.
*H04M 1/247*  (2006.01)
*H04M 1/725*  (2006.01)
(Continued)

(52) U.S. Cl.
CPC ..... *H04M 1/7255* (2013.01); *H04M 1/27455* (2013.01); *H04M 1/274525* (2013.01); *H04M 1/72522* (2013.01); *H04M 1/72583* (2013.01); *H04W 4/12* (2013.01); *H04W 12/06* (2013.01); *H04M 1/2472* (2013.01); *H04M 1/2477* (2013.01); *H04M 1/274533* (2013.01); *H04M 1/663* (2013.01); *H04M 2203/256* (2013.01); *H04M 2250/22* (2013.01)

(58) Field of Classification Search
CPC ............. H04M 1/2472; H04M 1/2477; H04M 1/274533; H04M 3/533; H04M 2203/45; G06F 3/0482
See application file for complete search history.

(56) References Cited

U.S. PATENT DOCUMENTS

| | | | | |
|---|---|---|---|---|
| 5,699,089 A | * | 12/1997 | Murray | G06F 3/033 345/902 |
| 5,706,334 A | * | 1/1998 | Balk | H04M 1/2477 348/552 |
| 5,754,636 A | * | 5/1998 | Bayless | H04M 1/2473 379/142.1 |
| 5,922,071 A | * | 7/1999 | Taylor | G06F 9/526 713/1 |

(Continued)

*Primary Examiner* — Alvin Tan
(74) *Attorney, Agent, or Firm* — HP Inc Patent Department

(57) ABSTRACT

Embodiments described herein provide a method and technique for operating a computing device. An interface is displayed for enabling the computing device to control a voicemail system. The interface includes one or more display objects, wherein each display object is selectable by a user to enter a command input assigned to that display object. A selection is detected of any one of the one or more display objects, and the command input assigned to the display object is identified. A signal tone is generated corresponding to the command input. The signal input may be transmitted across a network to the voicemail system to communicate a command to the voicemail system.

20 Claims, 22 Drawing Sheets

Related U.S. Application Data continuation-in-part of application No. 10/616,108, filed on Jul. 8, 2003, now abandoned, and application No. 11/202,408, which is a continuation-in-part of application No. 09/977,871, filed on Oct. 14, 2001, now Pat. No. 7,007,239, which is a continuation-in-part of application No. 09/668,123, filed on Sep. 21, 2000, now Pat. No. 6,781,575, and a continuation-in-part of application No. 09/374,095, filed on Aug. 12, 1999, now Pat. No. 6,516,202.

(60) Provisional application No. 60/467,794, filed on May 1, 2003.

(51) Int. Cl.
*H04W 4/12* (2009.01)
*H04W 12/06* (2009.01)
*H04M 1/2745* (2006.01)
*H04M 1/663* (2006.01)

(56) References Cited

U.S. PATENT DOCUMENTS

| | | | | |
|---|---|---|---|---|
| 5,943,055 | A * | 8/1999 | Sylvan | G06F 3/0481 379/201.04 |
| 6,018,571 | A * | 1/2000 | Langlois | G06F 3/0481 379/201.02 |
| 6,233,318 | B1 * | 5/2001 | Picard | H04L 12/5835 379/88.12 |
| 6,463,304 | B2 * | 10/2002 | Smethers | G06F 1/1626 455/566 |
| 6,851,115 | B1 * | 2/2005 | Cheyer | G06F 9/465 709/202 |
| 7,068,641 | B1 * | 6/2006 | Allan | H04M 3/42136 370/352 |
| 7,420,544 | B2 * | 9/2008 | Ono | G06F 3/0489 345/172 |
| 7,532,913 | B2 * | 5/2009 | Doulton | H04L 12/5835 455/412.1 |
| 2001/0043687 | A1 * | 11/2001 | Tidwell | H04B 1/202 379/110.01 |

* cited by examiner

METHOD AND APPARATUS FOR ACCESSING A CONTACTS DATABASE AND TELEPHONE SERVICES

RELATED APPLICATIONS

This patent application is a continuation of U.S. patent application Ser. No. 11/202,408, filed Aug. 10, 2005, which is a continuation-in-part of Ser. No. 10/616,108, filed Jul. 8, 2003, which claims priority to U.S. Provisional Patent Application Ser. No. 60/467,794, filed May 1, 2003. The application is further a continuation-in-part of the U.S. patent application Ser. No. 09/977,871, filed Oct. 14, 2001 (now issued as U.S. Pat. No. 7,007,239), which is a continuation-in-part of U.S. patent application Ser. No. 09/668,123, filed Sep. 21, 2000 (now issued as U.S. Pat. No. 6,781,575), and a continuation-in-part of U.S. patent application Ser. No. 09/374,095 (now issued as U.S. Pat. No. 6,516,202). Each of the aforementioned priority applications are hereby incorporated by reference in their entirety.

TECHNICAL FIELD

Embodiments described herein relate to the field of computer-human interfaces. In particular, embodiments described herein relate to a graphical interface for operating a computer based telephony device and an interface for accessing names and telephone numbers from a contacts database.

BACKGROUND

Computing devices, particularly handheld and portable devices, have evolved to include numerous types of communication capabilities and functionality. For example, handheld devices exist that operate as cellular phones, messaging terminals, Internet devices, while including personal information management (PIM) software and photo-management applications. Additionally, Internet Protocol services exist that can transform Internet-enabled machines into telephony devices. Even stand-alone telephones that connect to traditional Public Switched Telephone Networks (PSTN) are including more software to enhance the telephone's functionality.

In enhancing telephony operations with computing resources and software, effort has been made to enhance and assist the user in using such devices. For example, software features exist to facilitate the ease in which the user can establish a speed dial, and to make recently used phone numbers more readily available to users. Small form-factor computing devices, such as devices that provide cellular phone functionality, have particular use for speed dial features, in order to reduce the manual involvement of the user. These devices have smaller keyboards that may be harder to operate, and/or use in mobile or dynamic environments, where the user cannot readily retrieve a desired number.

Telephony devices are just one type of communication device. There are now many types of communication types, and multi-functional devices exist to accommodate the different communication types. Examples of communication types other than telephony include e-mail, instant message (including SMS protocol messages and Multimedia Message Service (MMS) protocol messages), and video conferencing. Many computing devices, particularly smart phones, are enabled to support communications using multiple communication mediums.

DETAILED DESCRIPTION

Figure 1A:
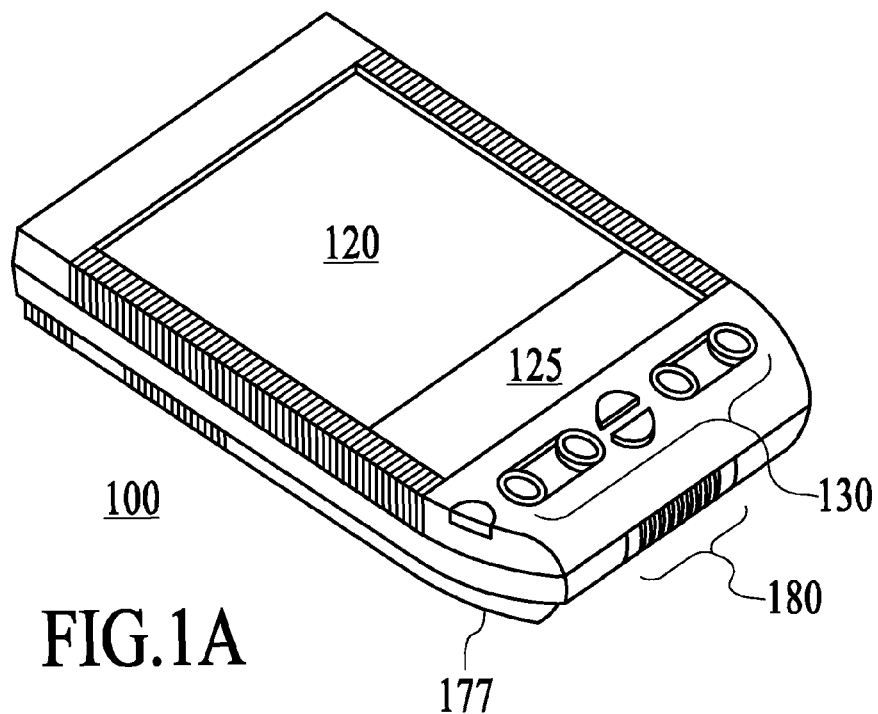
FIG. 1A is a front isometric view of a handheld computer system on which an embodiment of the invention may be implemented.

According to one or more embodiments described herein, a system and method are provided for enabling a user of a computing device to access and use a voicemail system using a displayed or mechanical interface.

Embodiments described herein provide a method and technique for operating a computing device. An interface is displayed for enabling the computing device to control a voicemail system. The interface includes one or more display objects, wherein each display object is selectable by a user to enter a command input assigned to that display object. A selection is detected of any one of the one or more display objects, and the command input assigned to the display object is identified. In one embodiment, to select a display object, the user can touch an on-screen button or may press a corresponding key of the computing device. In a further embodiment, the arrangement of on-screen buttons may correspond to the arrangement of keys. A signal tone is generated corresponding to the command input. The signal input may be transmitted across a network to the voicemail system to communicate a command to the voicemail system.

Additionally, one or more embodiments described herein provide a method and apparatus for accessing a contacts database and telephone services is herein disclosed. In one embodiment, ambiguous key entries that can be resolved either numerically or alphabetically or resolved for both functions of looking up a contact and dialing a number.

In the following description, for purposes of explanation, specific nomenclature is set forth to provide a thorough understanding of the present invention. However, it will be apparent to one skilled in the art that these specific details are not required in order to practice the present invention. For example, the present invention has been described with reference to handheld computer and cellular telephone systems. However, the same techniques can easily be applied to other types of telephony devices such as non mobile telephone systems.

One or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

Figure 1B:
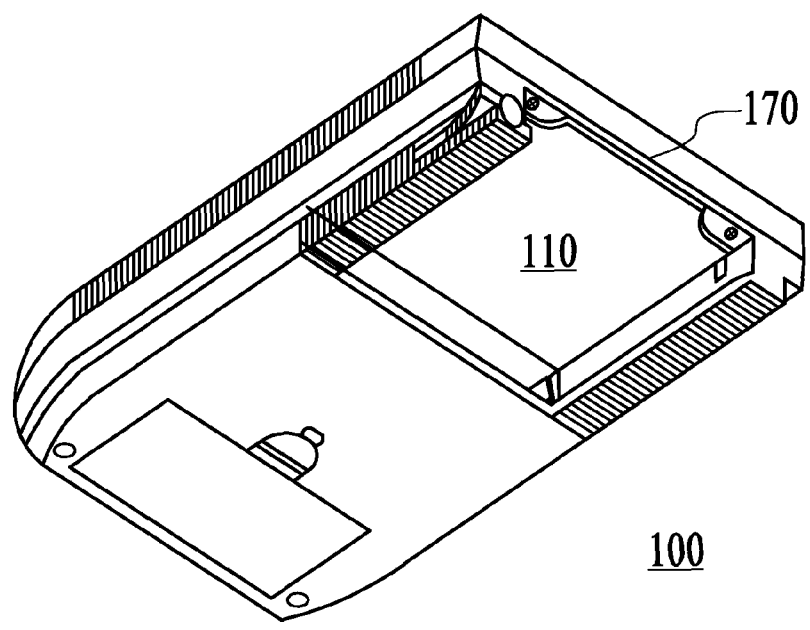
FIG. 1B is rear isometric view of the handheld computer system of FIG. 1.

FIG. 1A and FIG. 1B illustrate a first handheld computer system 100. As illustrated, the handheld computer system includes a display 120 and several physical buttons 130. The display 120 includes a visual display, such as a liquid crystal display (LCD) for presenting information to a user. The user may manipulate physical buttons 130 to input information into the handheld computer system 100 and make selections of information presented on display 120. In one embodiment, the display 120 may be contact-sensitive, in that a digitizer pad may be integrated into the display 120. For example, an LCD screen may overlay a digitizer pad and form one display assembly.

The handheld computing system 100 further includes a connection 180 in a bottom area for the handheld computing system 100. The connection 180 is designed to connect with another device, such as a computer system, for example. In one embodiment, the connection 180 may comprise a serial connection, such as a Universal Serial Bus (USB) connection or an RS-232 connection. Alternative types of connections may be used.

The handheld computing system 100 further includes a void 110 in the back area 177 of the handheld computing system 100. The void 110 is designed to receive an extra element, such as through the top area 170 of the handheld computing system 100, for example. For one embodiment, the extra element may be a simple place holder. For another embodiment, the extra element may be something else, such as a cellular transceiver 150.

In operation, the display 120 provides information, and also a means by which the user can enter input. For example, a user may employ a stylus or tipped instrument to make contact with the display and enter input, while at the same time viewing content generated for the display. In one mode of operation, a stylus can be used in the manner of a writing pen to enter characters and figures by drawing the stylus across the digitizer pad. Further, the user may be instructed to enter text into a specific area 125 of the digitizer pad. The stylus and digitizer may function like a computer mouse to operate and manipulate interactive elements on the display. For example, the computer system may present a virtual button in a location on the display that can be activated to perform an associated function by the user tapping the stylus or a finger on the digitizer pad at the virtual button location. Additionally or alternatively, a user may enter information into the handheld computing system 100 (and any extensions such as a cellular transceiver 150) via a microphone 112.

According to one embodiment, the handheld computer system 100 may include or be provided with wireless communication capabilities, including the ability to enable the user to make a voice calls and send messages (text, image or voice) across cellular networks. As an alternative to cellular networks, wireless network communication capabilities may be in the form of WiFi or Bluetooth connectivity (or even Infrared), where the handheld computer system 100 connects to a gateway to the Internet (or other network) through such wireless connection. Various aspects of a handheld your system and interconnected cellular radiotelephone are described in U.S. Pat. No. 6,516,202 (which is hereby incorporated by reference in its entirety by this application).

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

Figure 2:
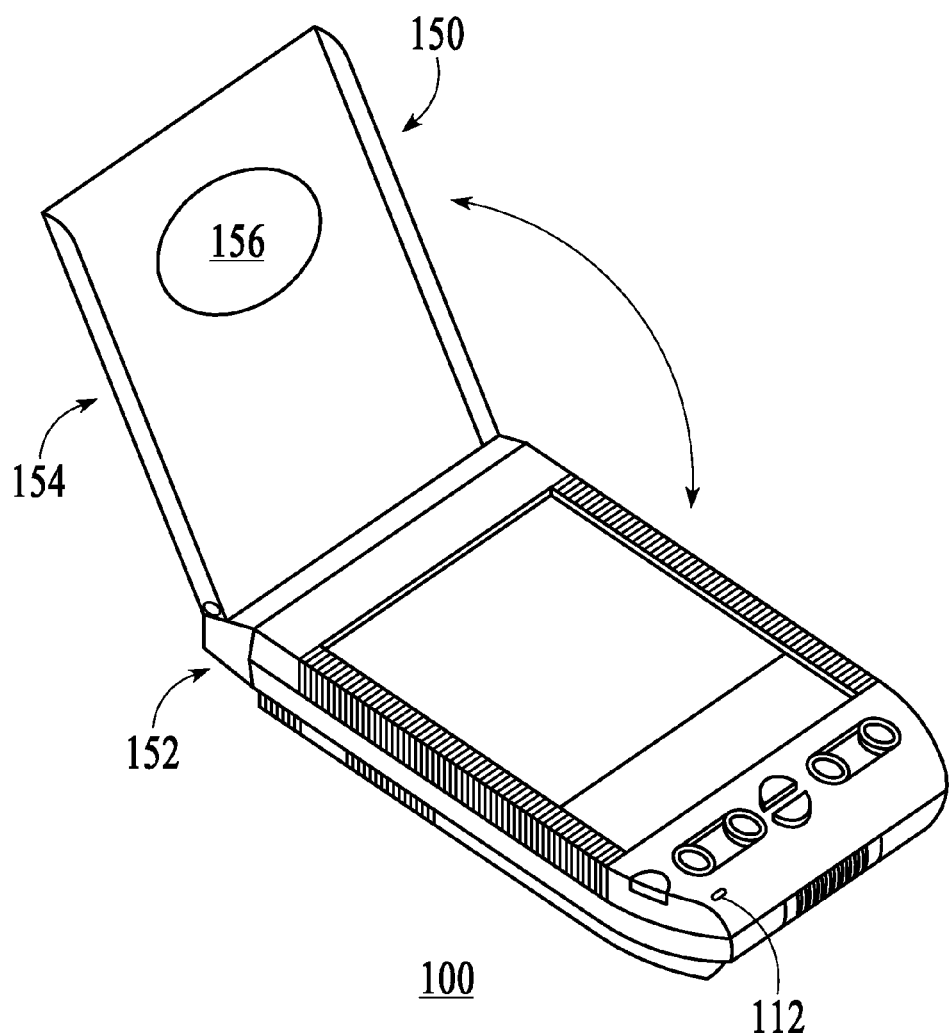
FIG. 2 is a front isometric view of the handheld computer system of FIGS. 1A and 1B equipped with a wireless communications peripheral attachment.

FIG. 2 illustrates a handheld computer having a cellular transceiver 150 that is a peripheral or accessory. One implementation provides that the handheld computer system 100 controls to cellular telephone transceiver 150 through software or other programming elements. The cellular telephone transceiver 150 may also included processor and built-in software or firmware that provides wireless communication functionality, connectivity and/or applications to the user. According to one embodiment, software may reside on either of the handheld computer system 100 or cellular transceiver 150 in order to provide a user interface when wireless communications and wireless can indication applications are being used. The cellular transceiver 150 may optionally include a flip lid 154 having a void 156. The void 156 may allow a user to view portions of the handheld computing system 100 when the flip lid 154 is in a closed position. The flip lid 154 may pivotably couple to a main body portion 152 for the cellular transceiver 150.

Figure 3B:
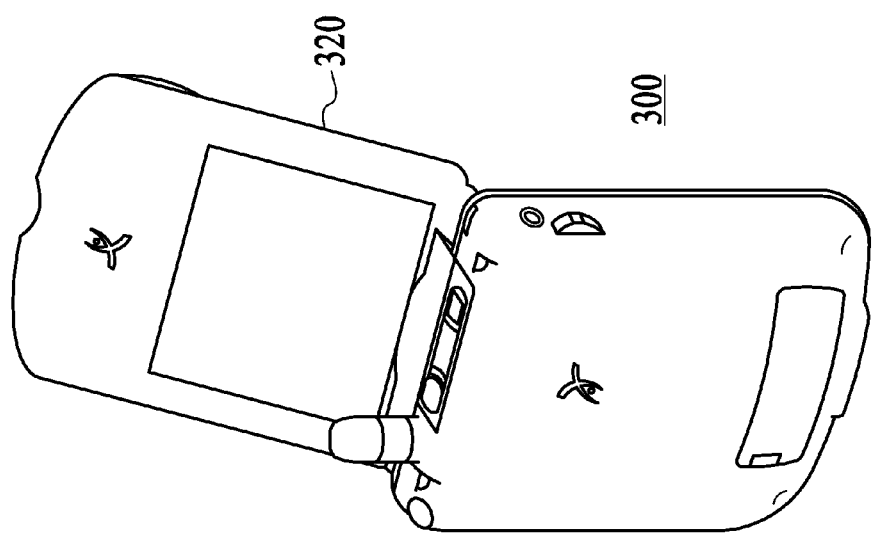
FIG. 3B is a rear isometric view of an integrated keyboard-based handheld computer and cellular telephone system.
Figure 3A:
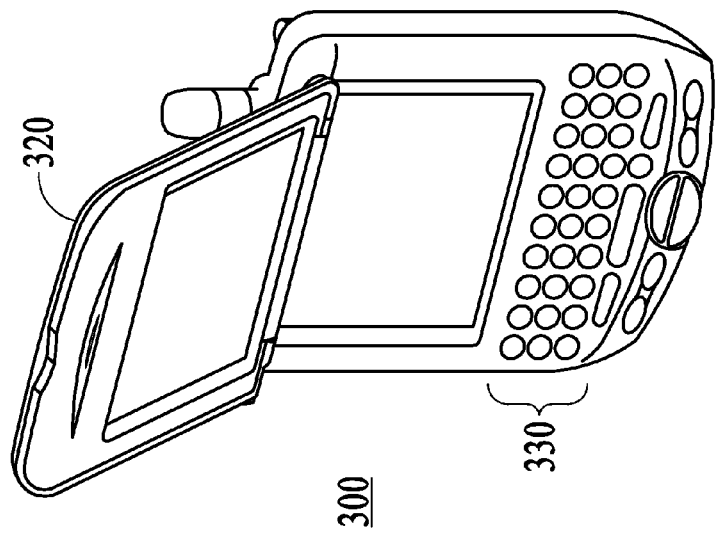
FIG. 3A is a front isometric view of an integrated stylus-based handheld computer and cellular telephone system.

FIGS. 3A and 3B illustrate a handheld computer with an integrated cellular telephony system 300. The integrated cellular telephony system 300 may enable voice and data transmissions over cellular networks. The integrated handheld computer and cellular telephone system 300 includes a keyboard 330 such that the user may easily enter names, addresses, phone numbers, and e-mail messages into application programs running on the integrated handheld computer and cellular telephone system 300.

Figure 3C:
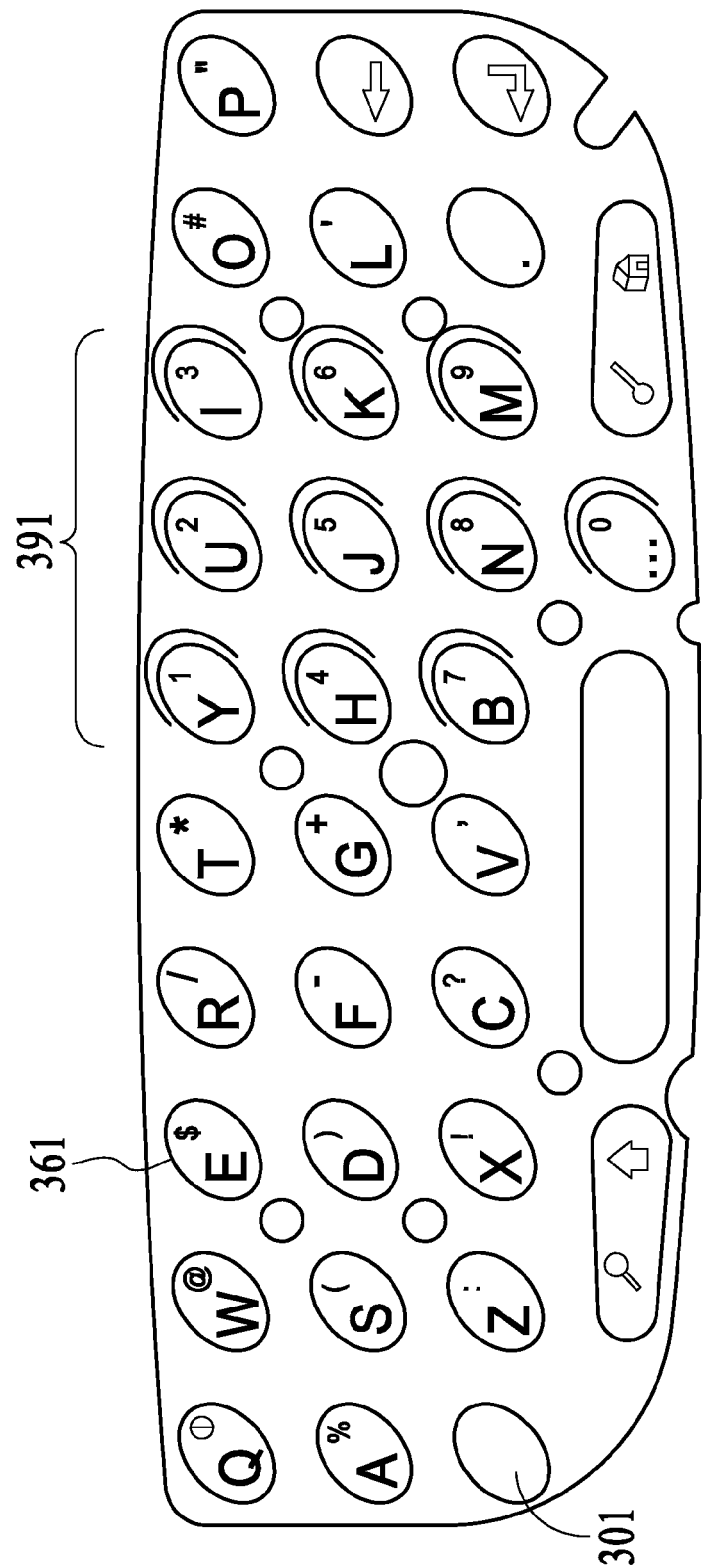
FIG. 3C illustrates one embodiment of a keyboard layout for the handheld computer and cellular telephone system of FIGS. 3A and 3B.

FIG. 3C illustrates one embodiment in which the keyboard is used as an input mechanism of the handheld computer and cellular telephone system 300 of FIGS. 3A and 3B. the keyboard includes an option key that is used to generate secondary characteristics from the various keys. For example, the "E" key 361 normally generates an "E" character. But if the "E" key 361 is pressed while simultaneously holding the option key 301, then the "$" character will be generated.

The keyboard of FIG. 3C also includes a digit dial pad area 391. Digit dial pad area 391 is laid out like a conventional touchtone telephone dial pad. In this manner, a user may dial telephone numbers (by selecting keys that carry numerical values representing the desired numbers) using the familiar mechanical touch-tone telephone dial pad. In one implementation, keys that comprise a digit dial pad area 391 have alternative alphanumeric values. For example, one key may have both number and letter value. To explicitly generate a number, a user may press the option key 301 in order to generate a numerical digit value from the keys into digit dial pad area 391. However, the software in the handheld computer and cellular telephone system 300 may interpret any keypress into digit dial pad area 391 as a numerical digit in certain contexts whether or not the option key 301 is the pressed. For example, if the user is entering a telephone number in a telephone number input field of a contact record, any key press from the digit dial pad area 391 will be interpreted as a numerical value whether or not the option key 301 is pressed.

As an alternative, no keyboard may be present on the integrated and cellular telephone system. Rather, the keyboard may be a completely visual input mechanism, provided on a contact-sensitive display of the integrated and cellular telephone system. The keyboard may be displayed, with individual keys including numerical values and/or character values, and the user may make contact with regions of the display area where the keyboard is being displayed. In this way, an embodiment permits a "soft" keyboard to operate very similar to the physical counterpart.

Telephone Terminal User Interfaces

Embodiments of the invention incorporate a speed-dial feature, in which specific actions (such as a press and hold of a physical button or key from a keyboard) is associated with dialing a phone number.

Figure 4:
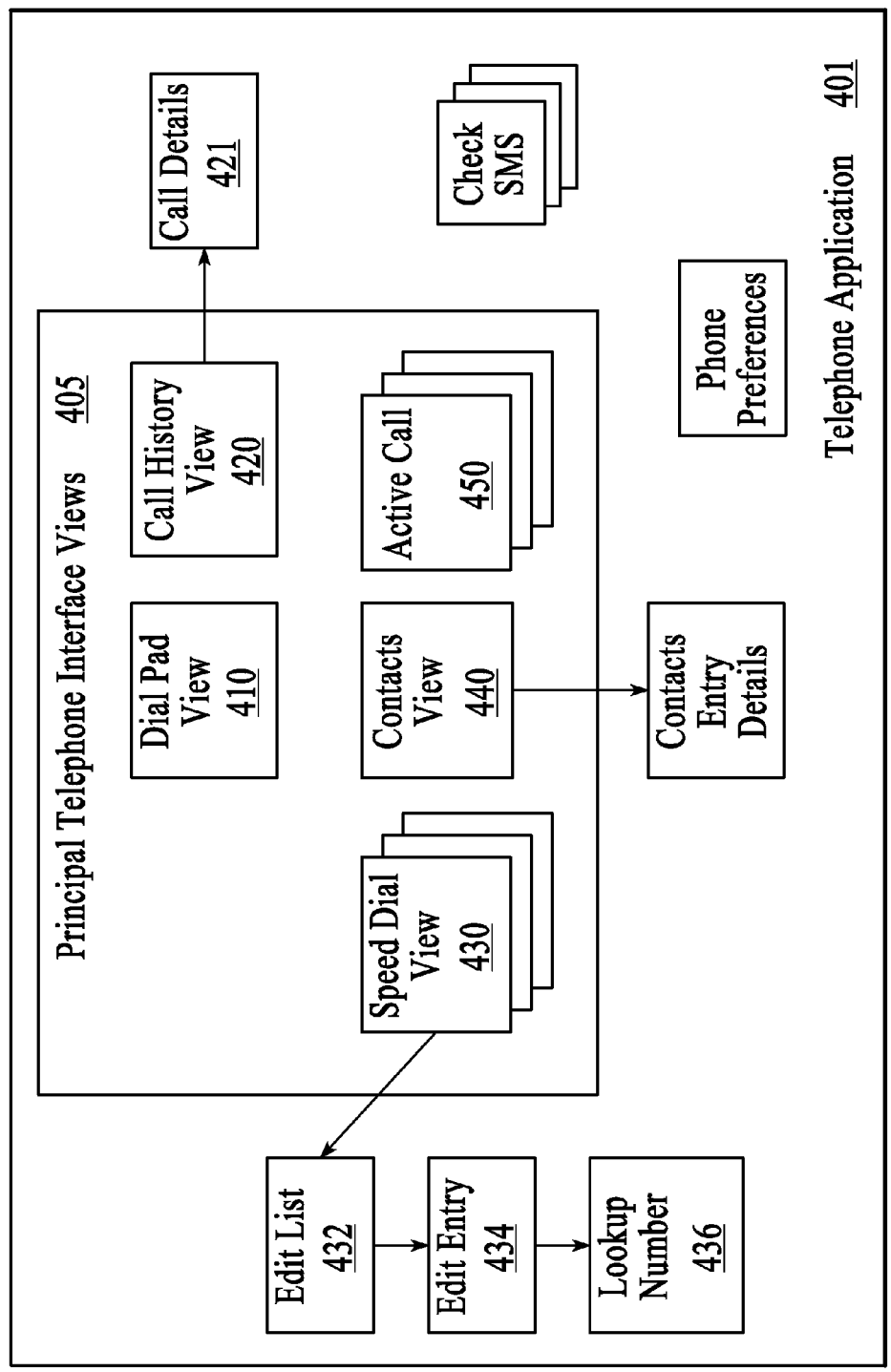
FIG. 4 is a functional block diagram of a telephone user interface software application.

According to an embodiment a cellular handheld computing device may incorporate a telephone user interface having multiple views. In one implementation, the views that are available include: a speed dial view, a dial pad view, a contact library view, a called history view, and an active call view. FIG. 4 illustrates a conceptual diagram of a phone application 401. As illustrated, phone application 401 generates and uses a set of principal telephone interface views 405, including a dial pad view 410, a call history view 420, a call detail view 421, a speed dial view 430, a contact view 440, and an active call view 450.

In one embodiment, certain events will cause the telephone application 401 to automatically see which between different views. Example when an incoming telephone calls detected, the telephone application 401 will automatically switch to the active call user interface view 450 in order to show the user information about the incoming telephone call.

Another event that may cause the telephone application to automatically switch between different views is the entry of characters from an input device such as a keyboard or stylus and digitizer pad (particularly when the display provides a soft keyboard). In one embodiment, entry of an alphabetic character will cause the telephone application 401 to move from one displayed view to the context view 440 in order to enable the user to search a database of contact records. Each contact record may contain fields having alphanumeric strings corresponding to one or more of the following: a first name, last name, a nickname, a place of work, a job title, a phone number, a mobile number, alternative numbers (home, fax), and messaging identifiers (including one or more of the following: email address, instant message identifier, Short Message Service identifier, Multimedia Message Identifier etc.). Programming elements associated with the contact user view 440 may match an entered character or character string (a search string) with a field of individual contact records in the contact library.

In one implementation, a user input corresponding to a numeric value may cause the telephone application 401 to automatically switch to dial pad view 410. The aforementioned implementations provide examples of embodiments of the invention, some of which are described below.

Dial Pad View

Figure 5A:
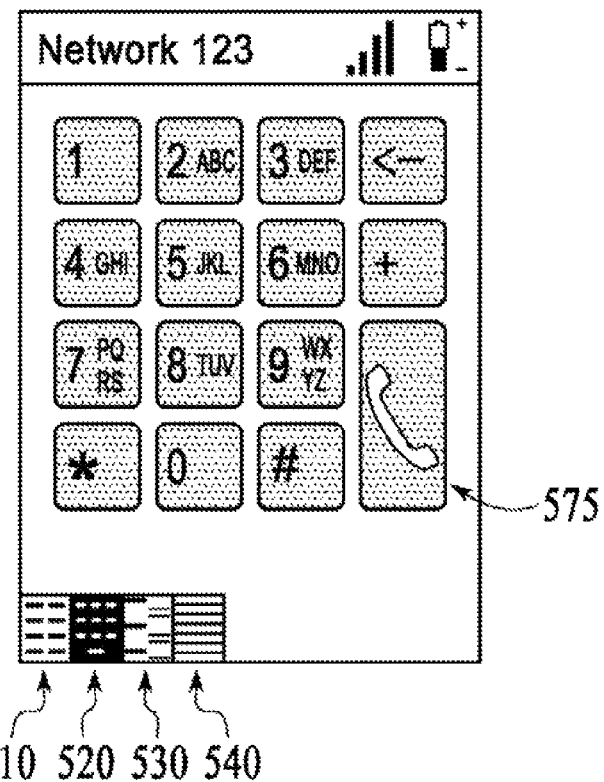
FIG. 5A illustrates one possible embodiment for a display arrangement for a telephone dial pad user interface view.

In one embodiment, dial pad view 410 may include or be associated with programming elements that provide a conventional DTMF (Dial Tone Multiple Frequency) touchtone dial pad interface 575 to users such to users may make outgoing telephone calls with a traditional telephonic interface. FIG. 5A illustrates one implementation of dial pad view 410. In one implementation, dial pad view 410 is an initial user interface for telephone application 401, under the assumption that placing phone calls is a primary use of a device incorporating the telephone application.

A user may operate a device incorporating the telephone application 401 by touching the device's display area where desired numbers of the dial pad appear. An icon or other input mechanism may be used to cause the device to use a series of numerical inputs as a phone number in a dialing function.

The dial pad view 410 may be invoked automatically or manually in connection with an active telephone call. As such the dial pad view may be used to enter DTMF touchtones in order to access interactive response systems, such as voicemail systems or telephone banking systems.

In one embodiment, when a user begins entering a telephone number, the telephone number being dialed is placed in a title bar 590. The user may also access the last ten telephone numbers dialed ("redial list") by scrolling up or down. Specifically, getting the scroll up or down key will move through the last ten numbers dialed and individually display each number in the title bar 590.

One implementation provides that the dial pad view 410 (or any other view) includes four soft keys or buttons that are selectable to enable the user to access additional views of the user-interface framework. In one implementation, soft buttons provided on the dial pad view 410 include a speed dial view button 510, a dial pad view button 520, a contacts view button 530, and a call history view 540. In an example provided, the dial pad view button 520 is shown highlighted by inverted graphic colors since the dial pad view 410 is active. In order to select any of the other views, a user selects the associated view button 510, 520, 530 or 540. The user may also repeatedly press an application button associated with the telephone application to rotate through the various telephone application user interface views (including the active call view if there is an active call in progress).

Figure 5B:
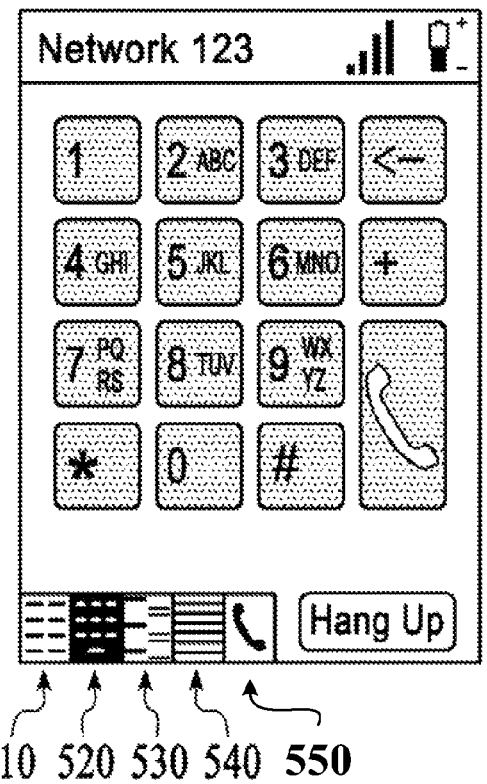
FIG. 5B illustrates the telephone dial pad user interface view of FIG. 5A when there is an active telephone call.

In an embodiment, an additional user interface view may be made available when there is an active telephone call. FIG. 5B illustrates an embodiment in which an active call view button 550 may be used by the user to access an active call view. In an implementation shown, the active call view button 550 is present only when there is an active telephone call.

In embodiments in which a keyboard is provided with the computing device, then a user may dial a phone number using the keyboard. In many cases, keyboards include keys that are individually interpretable as either a character or a phone number. In such cases, the computing device may include programmatic elements to bias the interpretation of any key press in connection with the dial pad area 391 as a number. For example, an implementation may provide that if the key press is interpretable as a number, then the key press will be interpreted as a number. Otherwise, if the key press has no numerical value (e.g. it is character only), then it is ignored. In an alternative embodiment, the dial pad view 410 may be used to provide a means of entering telephone numbers that use letter mnemonics. For example, 1-800-FLOWERS is a floral service that uses letter mnemonics in order to have potential customers easily remember the contact telephone number. However, dialing a telephone number with letter mnemonics can be difficult to users who must search keys of a dial pad or keyboard for alternative DTMF tones that translate to the mnemonics. In order to allow the user to quickly enter such telephone numbers, one embodiment allows the user to enter the letters directly, and a computer may translate the letters into the proper of associated DTMF tones. For example, if the text for "FLOWERS" were entered, the DTMF tones associated with dial pad numbers "3549377" would be generated. FIGS. 5A and 5B illustrate an alphabet DTMF mapping.

Certain aliasing may occur in such an alternative embodiment. However, an intelligent program may use certain heuristics or other logic to determine the desired number in most circumstances. For example, if the user were to dial the full number "1800FLOWERS" without using the option key 301 to specify the "1800" portion as numbers, the system would not know if the first four digits should be interpreted as numbers ("1800") or letters that should be translated into associated DTMF tones (e.g. "YN))" equivalent to dial numbers "9400"). But a heuristic could be used to always translate the "YN00" pattern into the common "1800" prefix for 11-digit numbers. The "FLOWERS" portion may be recognized as a letter mnemonic in an embodiment that uses the keyboard of FIG. 3C since none of the letters in "FLOWERS" share a numerical value. (at least in the example provided). As another example, the mnemonic "LAWYERS" is ambiguous since the letter "Y" and the number "1" are on the same key on the keyboard of FIG. 3C. In such circumstances, the system could use the heuristic that "all ambiguous letter/number keystrokes located between two certainly letter key strokes should be interpreted as letters." Thus, since the "L" at the beginning of "LAWERS" and the "S" at the end of "LAWYERS" can only be interpreted as letters, then all key inputs between those two inputs ("AWYER") should be interpreted as letters.

Call History View

Referring to FIG. 4, an embodiment provides that a call history view 420 displays a list of previous incoming, outgoing, or miss calls. A user may use the displayed information of the call history view 420 to make a new outgoing call.

Figure 6:
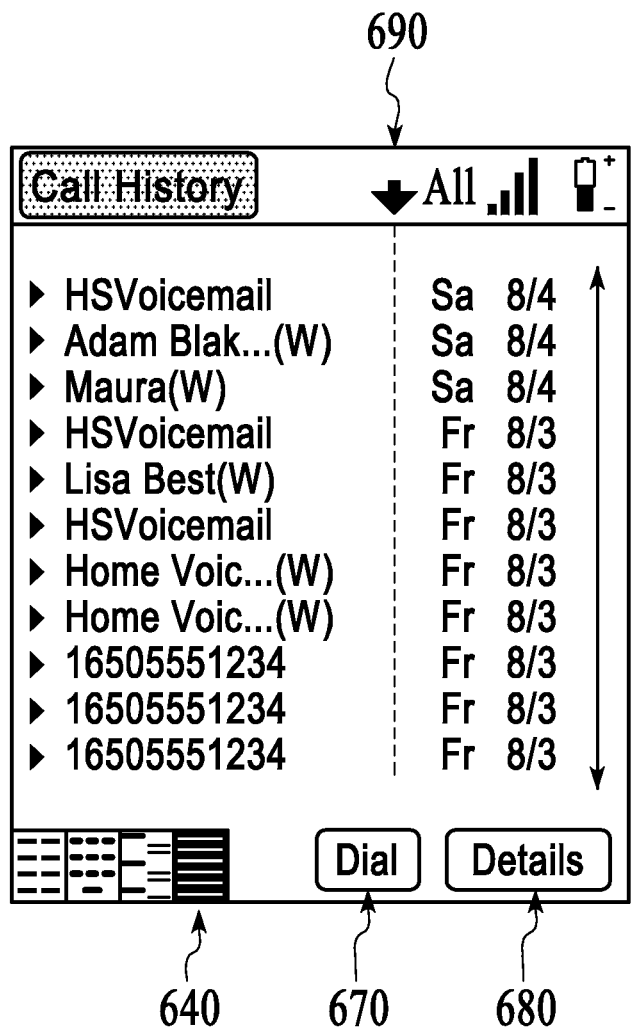
FIG. 6 illustrates one possible embodiment for a display arrangement for a telephone call history user interface view.

FIG. 6 illustrates one embodiment of the call history view 420. The call history view 420 may display called history view button 540 in a highlighted form (as the call history view 420 is active), denoted as highlighted call history view button 640. A user may filter information provided in a call history view 420 by changing the category selection 690 only the outgoing calls, or only to miss calls. The "ALL" selection illustrated in FIG. 6 illustrates all incoming calls, outgoing calls, and missed calls.

In one implementation, in order to dial a particular number from the call history list, the user may select a display item corresponding to a past call, and then activate the dial soft button 670. Alternatively they user may simply press the space bar or return key on the keyboard illustrated in FIG. 3A and FIG. 3C. in order to obtain more information on a particular selected call (via a selected display item for that call) in the call history list, and then activate a detailed soft button 680 to reestablish the call.

In one embodiment, if the user is in the call history view 420 and begins to enter alphabetic characters, the telephone application will automatically switch to the contacts view. The telephone application will then search a library of contact records for a desired contact using the entered character or characters as a search string. More information on this feature is provided with embodiments described below.

Speed Dial View

Referring to FIG. 4, an embodiment provides for a speed dial view 430 as an interface of the telephone application 401. The speed dial view 430 provides a list of designated or commonly called telephone numbers for quick access. In an implementation, the speed dial view 430 is configured by the user, who specifies the numbers that are to be speed dialed, as well as the action or input that is to trigger the speed dial for a specific number.

Figure 7:
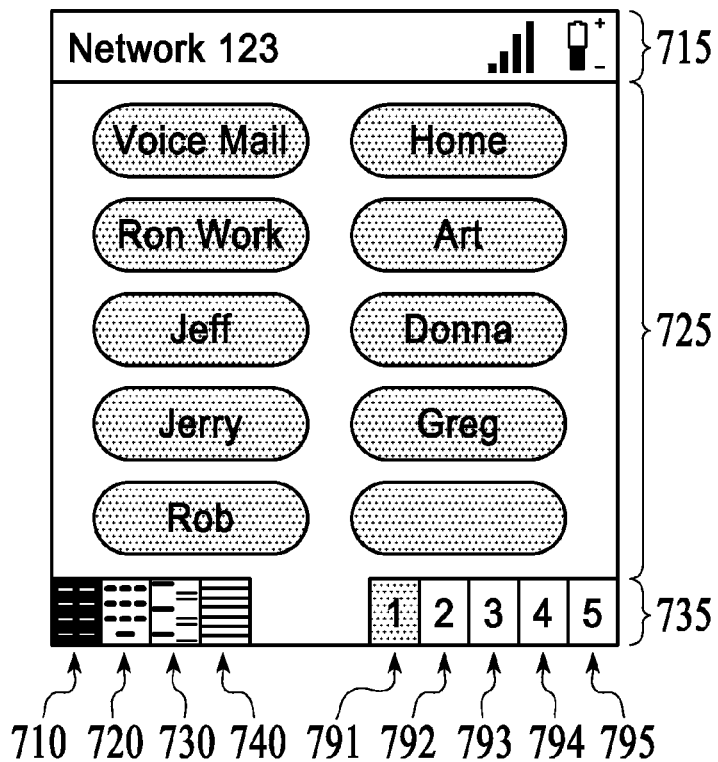
FIG. 7 illustrates one possible embodiment for a display arrangement for a telephone speed dial user interface view.

FIG. 7 illustrates an implementation of the speed dial view 430. As with other views, the speed dial soft button 510 is in a selected state as compared to other soft buttons for other views. In an embodiment shown, the speed dial view 430 has a title bar 715 (provided near the top of the view) and a command button area 735 (provided towards the bottom of the view).

An area 725 between the title bar 715 and command button area 735 on the speed dial view 430 is occupied by ten programmable speed dial buttons, arranged in two columns of five buttons per column. Each of the speed dial buttons correspond to a speed dial record. The speed dial record tag or label (or a portion or representation thereof) is displayed on the screen button, and activating (e.g. "tapping") a button with a label causes the telephone application to control the handheld computer and telephone peripheral to dial the telephone number of the corresponding speed dial record. A user may customize all of the different speed dial buttons with their own personal numbers and short-cuts. The command button area 735 may include a speed dial view button 710, a dial pad view button 720, a contacts view button 730, and a call history view 740, which are similar to the respective view buttons 510, 520, 530 and 540 described with reference to FIG. 5.

In an embodiment shown, speed dial user interface view of the present embodiment implements a page metaphor, whereby a plurality of speed dial "pages" are each used to store a sub-set of speed dial records. In FIG. 7, there are five different speed dial pages. To navigate between the different speed dial pages, there are a set of five numbered speed dial page buttons 791, 792, 793, 794, and 795 in the lower left corner of the speed dial user interface view. The currently displayed speed dial view page is the first speed dial page such that first speed dial page button 791 is highlighted with inverted graphics. Tapping on any of the other page buttons 792, 793, 794, or 795 will effect display of the contents of that page (and that page button will then become highlighted).

The user may navigate though the various speed dial entries using a scroll button. In FIG. 7, the voicemail speed dial button is highlighted with a pair of white brackets. Pressing a scroll down button would move the highlighting to the next non empty speed dial entry ("Ron Work" in this example). In one embodiment, pressing the up scroll button when the first speed dial entry is highlighted will move to a non empty speed dial button on the next non empty page of speed dial buttons (page 2 in this example assuming page 2 has a non empty speed dial button). In an alternate embodiment, pressing the pressing the up scroll button when the first speed dial entry is highlighted will move to a non empty speed dial button on the next non empty page of speed dial buttons (page 5 in this example assuming page 5 has a non empty speed dial button).

When the last non empty speed dial button of a speed dial page is highlighted ("Greg" in this example), pressing the scroll down button will move the highlight to the first non empty speed dial button of the next non empty speed dial page (page 2 in this example assuming page 2 has a non empty speed dial button.). In an alternate embodiment, pressing the scroll down button when the last non empty speed dial button of a speed dial page is highlighted ("Greg" in this example) will move the highlight to the first non empty speed dial button of the same speed dial page ("Voice Mail" in this example).

Figure 9A:
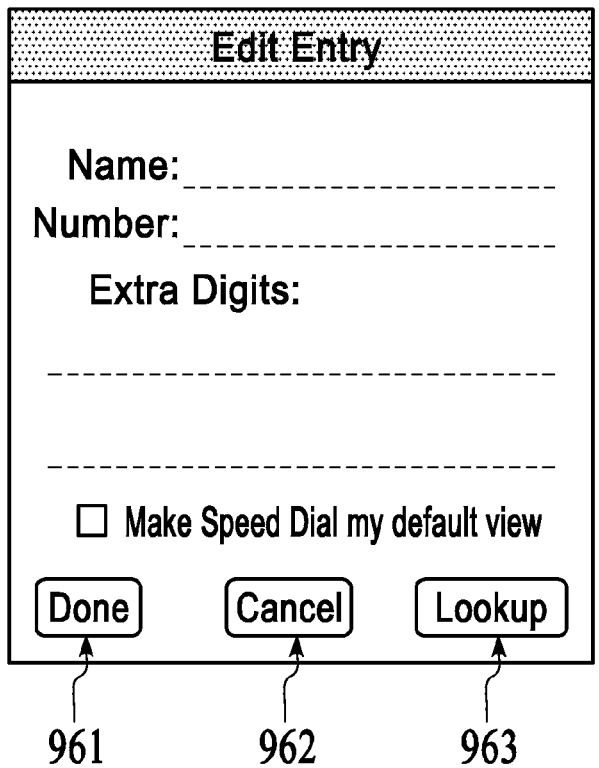
FIG. 9A illustrates one possible embodiment for a display arrangement for a telephone speed dial record creating user interface.

The basic operation of the telephone application from the speed dial user interface view in ordinary operation is as follows. Each of the five speed dial view pages has ten speed dial soft buttons that are user assignable. When a speed dial button has been assigned to a speed dial record by the user, that speed dial button displays the tag or label of the speed dial record. Tapping on (activating) a speed dial button causes the automatic dialing of the corresponding assigned telephone number. Tapping on a speed dial button with no number assigned (e.g. an empty button) effects display of an edit speed dial page as illustrated in FIG. 9A that allows the user to generate a speed dial record to be assigned to that button.

Figure 8:
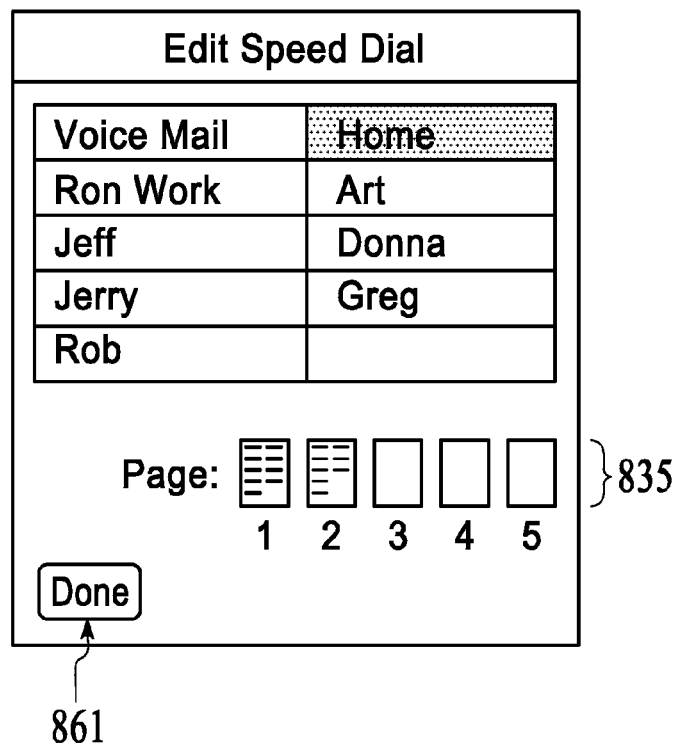
FIG. 8 illustrates one possible embodiment for a display arrangement for a telephone speed dial page editing user interface.

Tapping on the title bar 715 of the speed dial user interface view reveals a pull down edit menu (not shown). Selecting the edit menu causes an edit speed dial page (432 in FIG. 4) to be displayed. Referring back to FIG. 4, from the speed dial view 430 the speed dial data can be entered and amended by the user through edit list 432, edit entry 434 and find number functions 436 which are described in detail hereinbelow. The layout of the edit speed dial page is illustrated in FIG. 8. The edit speed dial page provides the primary basis by which the user can arrange speed dial settings on the Speed Dial pages, edit speed dial records (434 in FIG. 4) and find telephone numbers for assignment to the speed dial buttons (436 in FIG. 4).

The Edit Speed Dial page of FIG. 8 contains a table of ten "slots" arranged in two columns of five, with each slot corresponding to a speed dial button 725 on the speed dial user interface view. There are notionally five edit speed dial pages, one for each of the speed dial view pages. The slots in the table contain the text of the tags or labels for the speed dial records assigned to the corresponding buttons. When in the edit speed dial page view, one of the slots is always "selected", and the user can change the selected slot by tapping on the corresponding position of the table. In FIG. 8 the selected slot is indicated by inverted graphic colors Located below the table of speed dial buttons for a page is a set of speed dial page button icons 835 that operate in a similar manner to the speed dial page buttons 791, 792, 793, 794, and 795 and allow the user to navigate amongst the five edit speed dial pages. The speed dial page button icons 835, however, are larger than the speed dial page buttons 791, 792, 793, 794, and 795 because they also display an indication of the speed dial button assignments on each of the speed dial pages. This is achieved by small horizontal lines arranged in the speed dial page button icons 835 representing speed dial buttons on that page that have assigned speed dial records in the specified locations. For example, as seen in FIG. 8, the speed dial page icon has ten horizontal lines indicated that the first speed dial page has all slots occupied and thus all corresponding speed dial buttons assigned. The second speed dial page icon indicates that that page has two "empty" slots/buttons at the lower right positions. Speed dial pages three, four, and five are all shown as empty in FIG. 8. This icon display allows the user to quickly and easily determine which pages have empty slots/buttons at a glance from the edit speed dial page view, which is particularly useful for editing and rearranging speed dial assignments as described in greater detail hereinbelow.

The edit speed dial page may also contain several command buttons at the bottom of the screen for performing specific functions. In the embodiment of FIG. 8 only a "Done" 861 command button is illustrated. Tapping on the "Done" command button 861 returns the user to the speed dial user interface view. Other command buttons may be implemented to enable other operations to be performed on the speed dial record of the selected slot.

Tapping on an empty speed dial slot from the edit speed dial page causes the display of a new speed dial edit entry page as illustrated FIG. 9A. The new speed dial edit entry page displays the data of the speed dial record for the selected slot speed dial slot. In particular, the edit entry page has a "Name" field at for displaying and editing the speed dial record tag or label, and a "Number" field at for displaying and editing the telephone number for the speed dial record. The edit entry page also has a field labeled "Extra Digits" that provides the user the ability to specify a string of DTMF touch tones that may be sent by the user after initiating a telephone call using the telephone number associated with the speed dial record. For example, for a particular telephone number corresponding to a voicemail system, the user may specify a string of DTMF touch tones in the "Extra Digits" field for accessing the user's voicemail box. In another application of the "Extra Digits" field, the "Number" may contain a long distance service access telephone number and the "Extra Digits" field may specify a particular long distance account code.

The entry fields "Name", "Number", and "Extra Digits" in the edit entry page are each editable by the user in conventional manner on the handheld computer system 100. For example, the fields can be edited using the stylus on the touch sensitive screen or using a keyboard. When editing the "Number" or "Extra Digits" fields, the computer system may be put into a special "number lock" mode that only allows numbers or other touch tone characters such as "*" and "#" to be entered. The edit entry page has several command buttons labeled "Done" 961, "Cancel" 962, and "Lookup" 963. Tapping on the "Done" button 961 causes the telephone application to return to the edit speed dial page of FIG. 8, retaining any changes to the speed dial record made by the user. The "Cancel" button 962 effects return to the edit speed dial page of FIG. 8 but discarding any speed dial record changes. The "Lookup" button 963 allows the user to find a telephone number from the user's telephone book (to be described in the next section) to insert in the "Number" field.

Figure 9B:
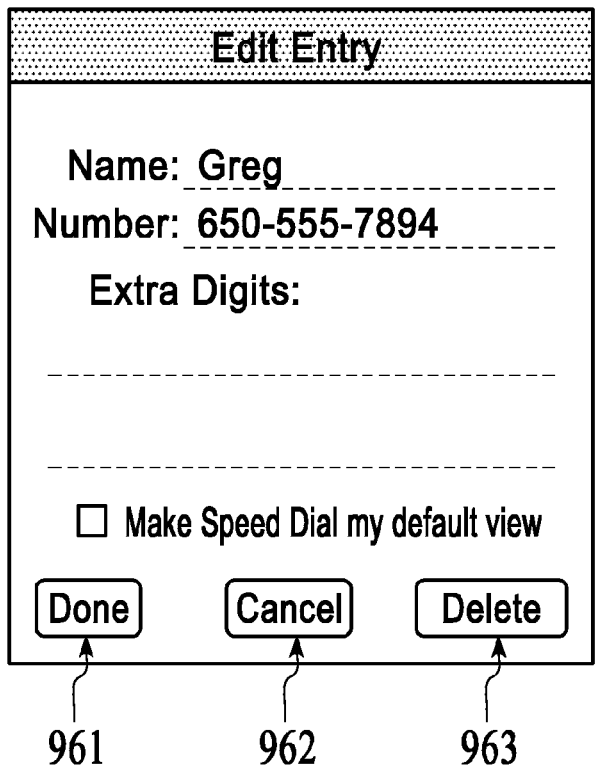
FIG. 9B illustrates one possible embodiment for a display arrangement for a telephone speed dial record editing user interface.

Referring to FIG. 8, tapping on an filled speed dial slot from the edit speed dial page causes the display of a existing speed dial edit entry page as illustrated FIG. 9B. The difference between the new speed dial edit entry page of FIG. 9A and the existing speed dial edit entry page of FIG. 9B is that the existing speed dial edit entry page replaces the "Lookup" button with a "Delete" button that allows the user to delete the speed dial record.

One special speed dial record is a voicemail speed dial record associated with the voicemail-box of the cellular telephone itself. To prevent loss of this special speed dial record, the voicemail record associated with the voicemail-box of the cellular telephone should not be deleteable. However, the voicemail record is moveable such that the user can place the voicemail record into any available speed dial slot.

When a user is in the speed dial user interface view and begins entering alphabetic characters, the telephone application will automatically switch to the contacts view of the telephone application. Once in the contacts view, the telephone application will begin searching for a desired contact using the entered character(s) as a search string as will be set forth in the following section describing the contacts user interface view.

Figure 10:
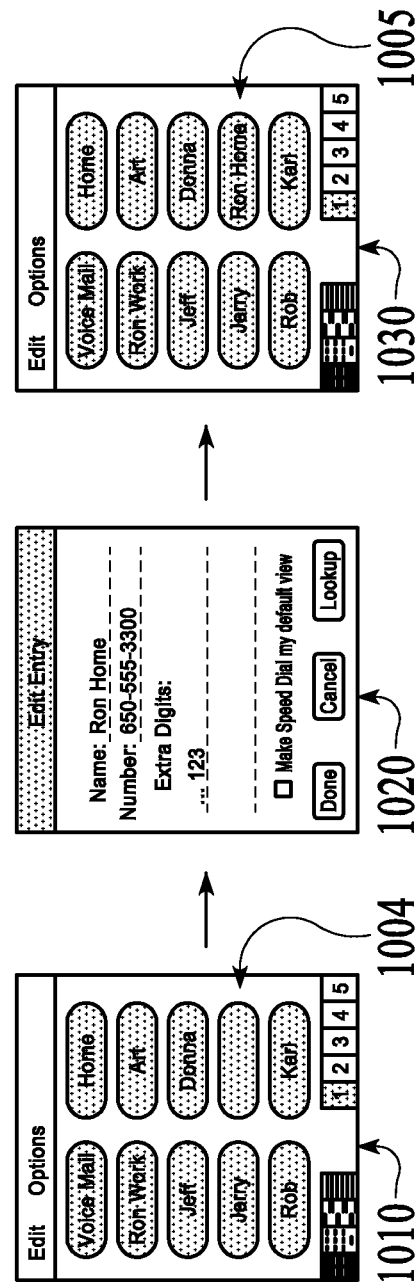
FIG. 10 illustrates a series of user interface screens navigated by a user when creating a new speed dial entry in an empty speed dial slot.
Figure 11:
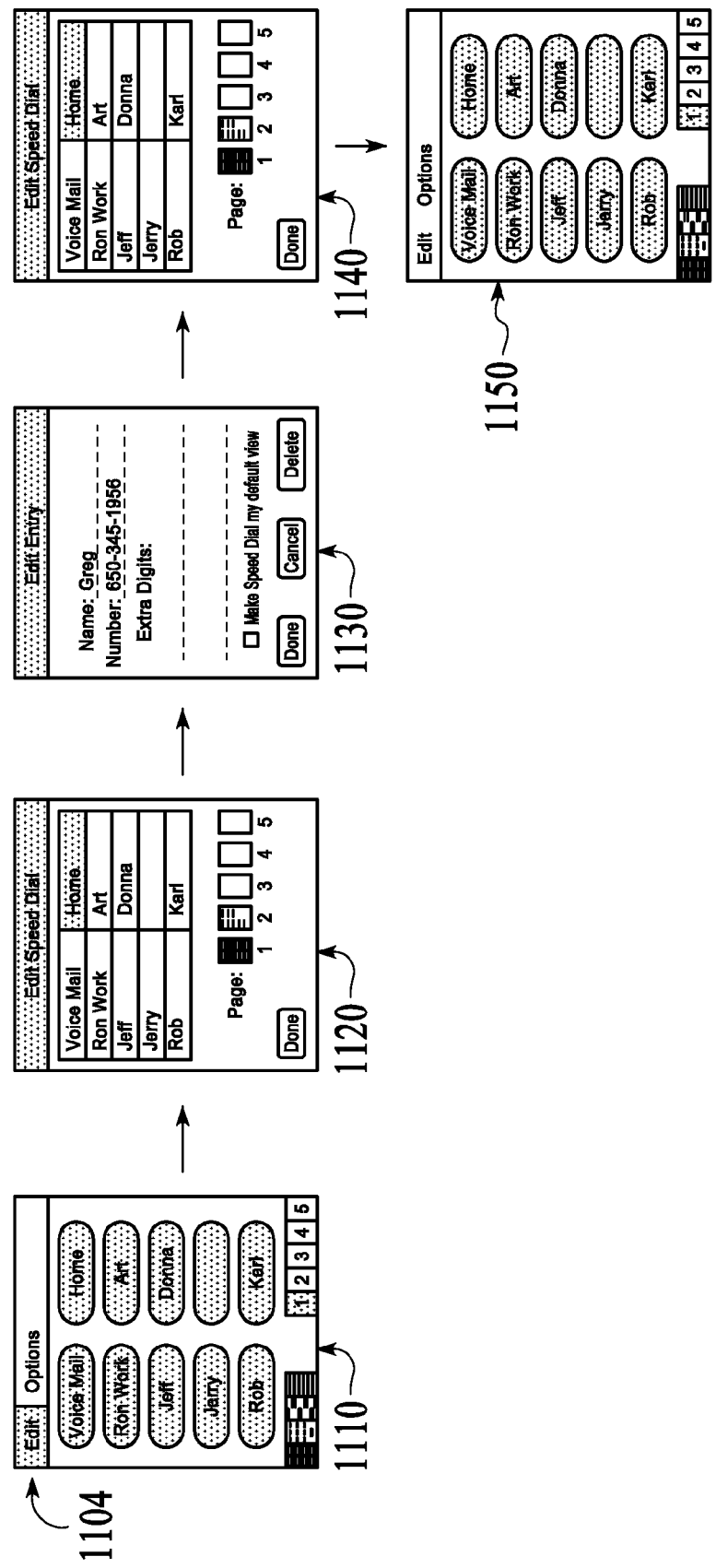
FIG. 11 illustrates a series of user interface screens navigated by a user when creating a new speed dial entry in a speed dial slot that already has a current speed dial record.
Figure 12:
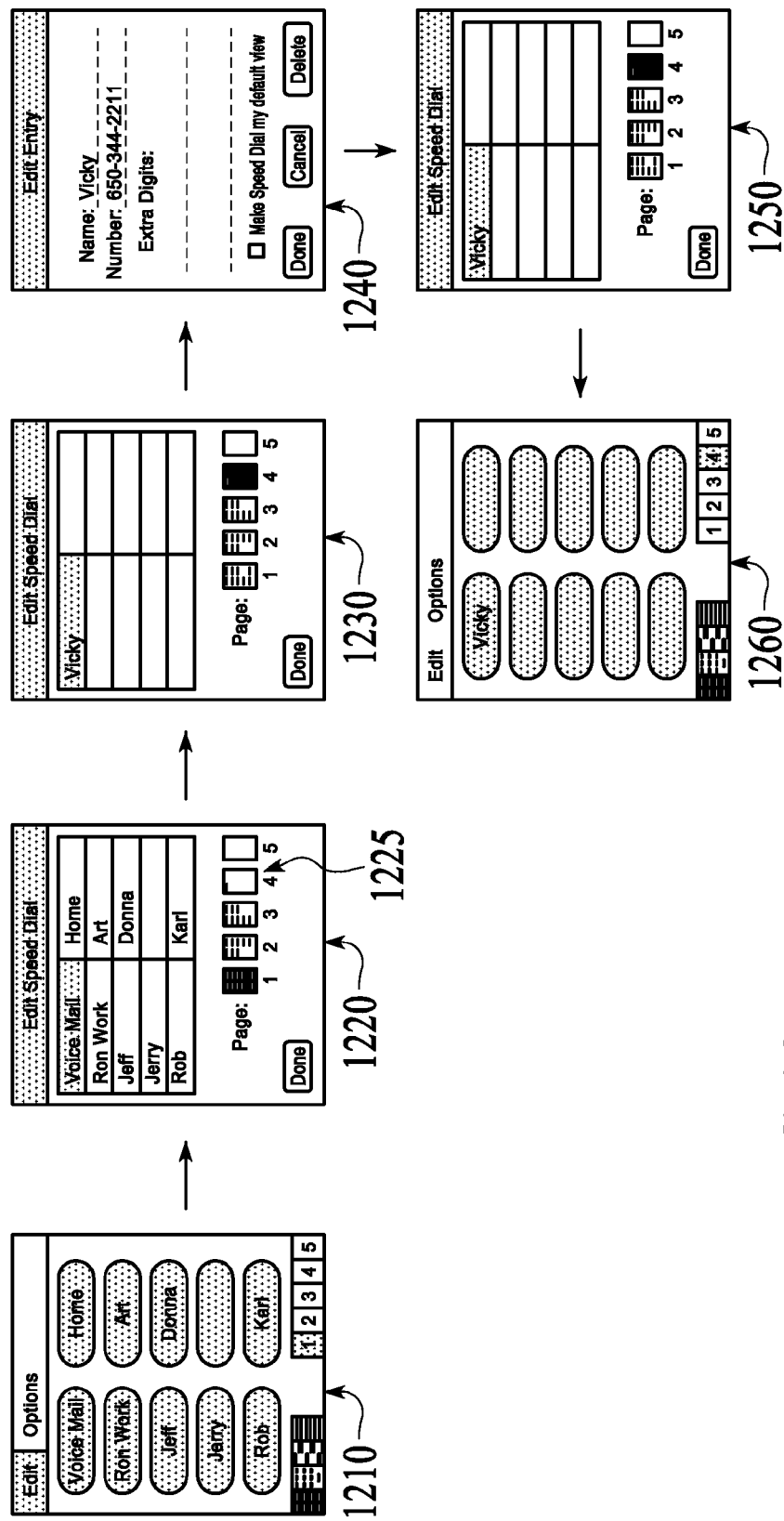
FIG. 12 illustrates a series of user interface screens navigated by a user when editing an existing speed dial entry from a different speed dial page.

FIGS. 10, 11, and 12 illustrate how the speed dial user interface view and its associated editing views can be used to create and edit speed dial records. The editing procedures are described with reference to the previously described speed dial editing screens.

FIG. 10 illustrates the creation of new speed dial button beginning from an empty button from a speed dial user interface view 1010. The user taps on an empty button 1004 that opens the edit entry page 1020 used to create new speed dial records or edit existing speed dial records. In the edit entry page 1020, the user enters data into the "Name", "Number" and optionally "Extra Digits" fields using conventional data entry means to create a new speed dial record. Tapping on the "Done" button effects return to the Speed Dial page 1030 with the previously empty button now assigned to the new speed dial record. The button 1005 now displays the Name field text, in this case "Ron Home" indicating that the speed dial button/slot is no longer empty.

A speed dial button insertion procedure is illustrated at in FIG. 11, beginning from a speed dial user interface page 1110. The user taps on the title bar of the Speed dial page and selects the revealed "Edit" menu item 1104. This cause the telephone application to bring up the edit speed dial page 1120 corresponding to the speed dial user interface page 1110. The user selects one of the slots on the edit speed dial page 1120 to edit and taps it. The telephone application then displays the edit entry page 1130, allowing the user to edit the speed dial record as previously described. The user taps on the "Done" button at the completion of the speed dial record editing to return to the edit speed dial page as shown at 1140. The selected slot now contains the edited speed dial record. Tapping on the "Done" button effects return to the corresponding speed dial page 1150, where the new speed dial record tag or label is displayed on the speed dial button.

A second speed dial record editing procedure is illustrated with reference to FIG. 12, beginning from a speed dial user interface view 1210. The user obtains the corresponding edit speed dial page 1220 through selection of the "Edit" pull-down menu item. In this case the user selects a different speed dial page to edit by tapping on the associated speed dial page icon 1225. An occupied speed dial slot on speed dial edit page 1230 is selected by tapping on it to transition to the edit entry page 1240 containing the speed dial record data for the selected speed dial slot. The user is then able to edit the speed dial record data as desired. After completing the desired edits, the user taps the "Done" button to store the amended speed dial record. The telephone application then returns to the edit speed dial page 1250 for the fourth speed dial page. Finally, tapping on the "Done" button on edit speed dial page 1250 returns the user to the speed dial user interface view 1260 of the edited speed dial page, the fourth speed dial page in this example.

Contacts View

Referring to FIG. 4, an embodiment provides for a contacts view 440 as an interface of the telephone application 401. In one embodiment, the contacts view 440 is a user-interface to a library of contact records stored on the computing device. Each contact record in the contacts database may contain the name, work address, home address, work telephone number, home telephone number, mobile telephone number, fax number, Internet e-mail edges, and other personal contact information. Additionally, alternative messaging addresses and identifiers may be included in each contact record, including for example, alternative email addresses, IM handle or identifier, SMS identifier, and MMS identifier.

Figure 13A:
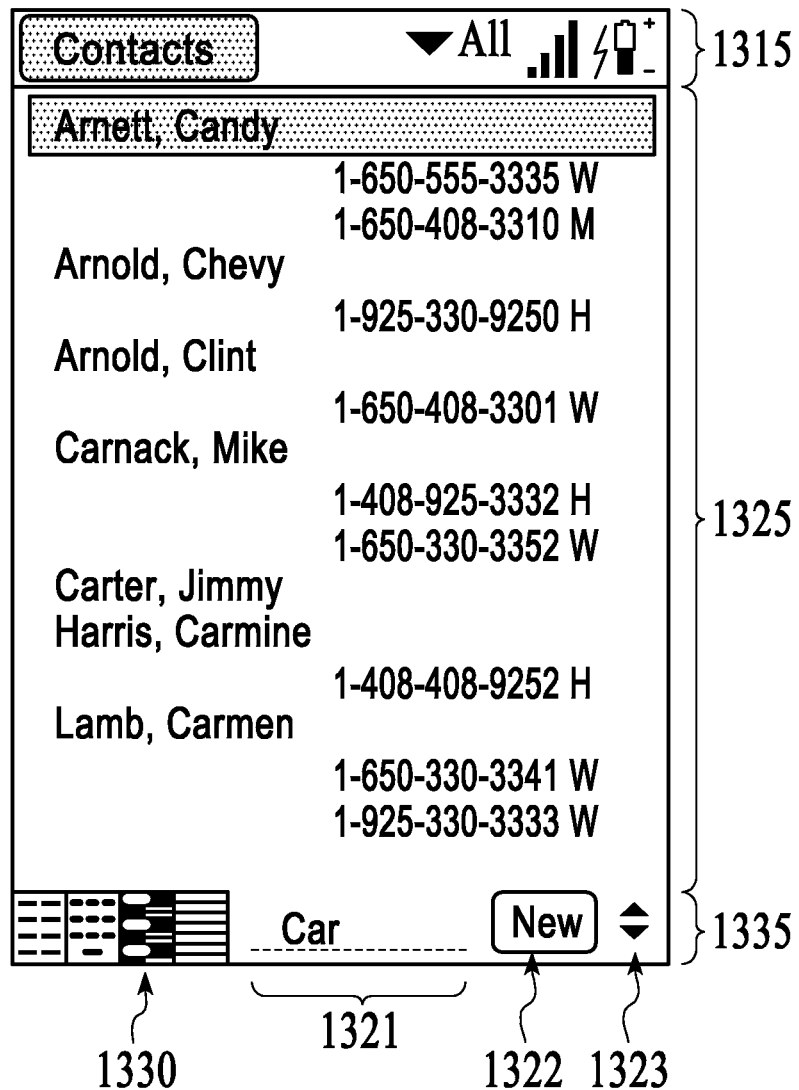
FIG. 13A illustrates one possible embodiment for a display arrangement for a telephone contacts user interface view.

FIG. 13A illustrates one embodiment of the contacts user interface view. Note that the contacts view button 1330 is now highlighted with inverted graphics. The contacts user interface view is comprised of a title bar 1315, a main area 1325, and command area 1335.

As illustrated in FIG. 13A, the main area 1325 of the contacts view comprises an integrated list of names and associated telephone numbers. The names may be listed as "last-name, first-name" or "first-name last-name" as selected by the user. Furthermore, the names will be displayed in alphabetical order using "last-name, first-name" or "first-name, last-name" as selected by the user. In the illustration of FIG. 13A, the names are listed in the "last-name, first-name" display format and order. The names displayed in the main area 1325 are left justified.

The telephone numbers associated with the displayed names are displayed below the associated name and right justified. Note that by using a full line for the name and a full line for each associated telephone number, the display will not need to abbreviate or shorten most names or telephone numbers. In an embodiment, only the voice telephony telephone numbers such as a home telephone number, a work telephone number, a main telephone number, a mobile telephone number and/or other voice telephone number associated with each name is displayed. Fax numbers are not displayed since it is generally not useful to dial a fax number from the computer-based mobile telephone system. The telephone numbers are listed in the same order as the telephone numbers exist in the contact record.

In the command area 1335 of the contacts user interface view resides a pair of scroll buttons 1323, a "new" button 1322, and a search field 1321. The new button 1322 allows the user to enter a new personal contact record. The scroll buttons allow the user to scroll up and down through the list of names and telephone numbers illustrated in the main area 1325 of the contacts user interface view.

The search field 1321 allows the user to search for a particular name in the database of personal contact information. Since the contacts database may store thousands of different contacts, a powerful search mechanism is needed. However, the search system must be simple and intuitive in order to be adopted by most users. To accomplish these goals, the search field of the present invention uses a multiple filter system to search the database of personal contact information.

The search field 1321 allows a user to enter characters from a desired name. Characters may be entered in different manners as dependent upon the particular handheld system. For example, the characters may be entered using a keyboard or entered using a stylus in association with character recognition software. After each character entry, the filter system produces a filtered subset of names and associated telephone numbers from the entire contacts database. At least a portion of that filtered subset is then displayed in the main area 1325. If an alphabetic character is entered while the user is in any of the other permanent user interface screens, the telephone application will immediately open the contacts user interface view and begin a search of the contacts database.

Contact Lookup Algorithm Implementations

In an embodiment, the system creates a subset that contains all names having a first name that matches the entered letters (for example "GR" would match the name Greg Shirai), a last name that matches the entered letters (for example "GR" would match the name Bob Green), or a first name initial and last name that matches the entered letters (for example "GR" would match the name George Robinson). Spaces within names are ignored for matching purposes in order to use the space bar on a keyboard as the signal to dial the number. Thus, "vand" matches the last name of name Jean-Claude Van Damme. When a user deletes a character, the search will add back names that now match the shorter string. Additional details on an filtering embodiment can be found in the co-pending patent application entitled "Multi-Context Iterative Directory Filter", filed concurrently with this application and hereby incorporated by reference.

Referring to FIG. 13A, the user has entered the characters "CAR" in the search field 1321. The search letters "CAR" match the names "Harris, Carmine" and "Lamb, Carmen" since the letters "CAR" are in the first names of those two names. The search letters "CAR" match the names "Carter, Jimmy" and "Carnack, Mike" since the letters "CAR" are in the last names of those two names. Finally, the search letters "CAR" match the names "Arnett, Candy", "Arnold, Chevy", and "Arnold, Clint" since the letters "CAR" match the initial of the first name and the first two letters of the last name of those three names. This final filtering criteria, the matching of a first name initial and last name is one of the most powerful features of the search system because there is not a large amount of aliasing in this filter. This final filtering criteria is particular useful when searching for the contact information for a particular family member since the common last name of family members will cause undesirable aliasing. In the example of FIG. 13A, if the user has family members "Arnett, Candy", "Arnett, Kevin", "Arnett, Paul" and "Arnett, Susan", only the name "Arnett, Candy" is displayed since it is the only family name that matches the "CAR" string. At any time during a search, the user may use scroll through the currently displayed search results by using scroll buttons 1323, scroll keys on a keyboard, or other scrolling input means.

According to another embodiment, the search string entered by the user may be searched in sets designated by the user, where each set corresponds to one or more characters. The user may designate each character string set, and during the lookup the device looks for contact records where each set is present in a separate name or other character value field of the contact record/For example, the user may enter either of the following: "JO S" or "JO SM" or "JO R S"; and receive as a result a record of a contact with the name "John Robert Smith". In the example provided, a space (or other designated character entry) is used to designate each character set that is to be searched against a separate name. In an embodiment, such as when the designated character entry delineating one set from another is present, the search is performed to find the record(s) that has separate fields with values that match one of the sets of character string. Thus, in the example provided, "JO" is not separated into different fields when the search is performed, but maintained as an atomic unit that is compared as a whole against values of individual fields in a given contact record.

Additionally, each character set may be compared against fields other than first, last or middle name. For example, each character set may be searched against a Company name, a title or position, or street address. For example, the entery "JO Pres" may return a record of "John Smith, President of XYZ Company etc."

Ambiguous Key Entry Handling

As previously set forth, the telephone application may automatically open the contacts user interface view if the user begins entering characters while in the speed dial or call history view. In an embodiment that uses a keyboard containing keys that are associated with both a letter and a digit, such as the Y/1 key on keyboard of FIG. 3C, it may be considered ambiguous as to whether the user is attempting to dial a number or spell out a name. For example, the series of keystrokes N/8,Y/1, K/6, K/6, and I/3 may be the name "Nikki" or the number "81663". In such a circumstance, one embodiment provides that the telephone application will assume that a name is being spelled out and search through the contacts database using some filtering means. However, if there is no matching contact and all the entered keystrokes were from keys that have both a letter and a digit, then the telephone application will assume the user is attempting to dial a telephone number with the key pad area 391 and automatically switch to the dial pad view and display the entered keystroke sequence as a series of digits. Thus, it is possible for a user to be in the speed dial user interface view, begin entering keystrokes, automatically switch to the contacts view, and then automatically switch to the dial pad view if the series of keystrokes were all from the dial pad area 391 and associate letters do not match any entry in the contacts database.

An embodiment also provides for the device to be in a look-up only mode of operation, where ambiguous keys that have both character and number assignments result in a number lookup. For example, if the user enters keys corresponding to N/8,Y/1, K/6, K/6, one matching result may be the return of a contact record containing the phone number (408) 555-1866. In this case, the user may see the whole number and dial it (when he only remembered an extension or a portion of it) or he may be able to access the whole contact record and use an alternative number for the contact with the matching number. Still further, the number sequence may be matched to a field other than phone number, such as home address ("866 Maple Street"), instant message or messaging identifier ("Tomm866687464" or "Tom866@email.com") or any other character value of a field contained in the contact record.

Referring back to FIG. 13A, in the main area 1325 of the contacts user interface view, either a name (from the left justified names) or a telephone number (from the right justified associated telephone numbers) may be highlighted for focus. Normally, the first telephone number in the main area 1325 is initially highlighted for focus. In FIG. 13A, the name "Arnett, Candy" is highlighted with inverted graphics after a user has scrolled upward. When a highlighted name is activated by pressing an enter key, a keyboard space bar, or other means, the system opens up a full contact editing screen for editing a contact record associated with the selected name. When a highlighted telephone number is activated by pressing an enter key, a keyboard space bar, or other means, then that highlighted telephone number is automatically dialed by the cellular telephone system.

In an embodiment, the telephone numbers are not displayed exactly as the telephone numbers are entered into the contact record. Instead, the telephone numbers are displayed exactly how the cellular telephone will dial the number. Thus, any rules for adding or removing area codes or other prefixes or postfixes should be applied before displaying the number. Similarly, any extraneous text such as "ext. 123" should be removed.

In an alternate embodiment, the email address (if available) associated with a displayed name is also displayed. The email address may be display on its own line just as the voice telephony telephone numbers are displayed. In this manner, the user of the device may highlight and activate the email address. Activating the email address may launch an email application with an outgoing message addressed to the selected email address as an initial screen display.

Figure 13B:
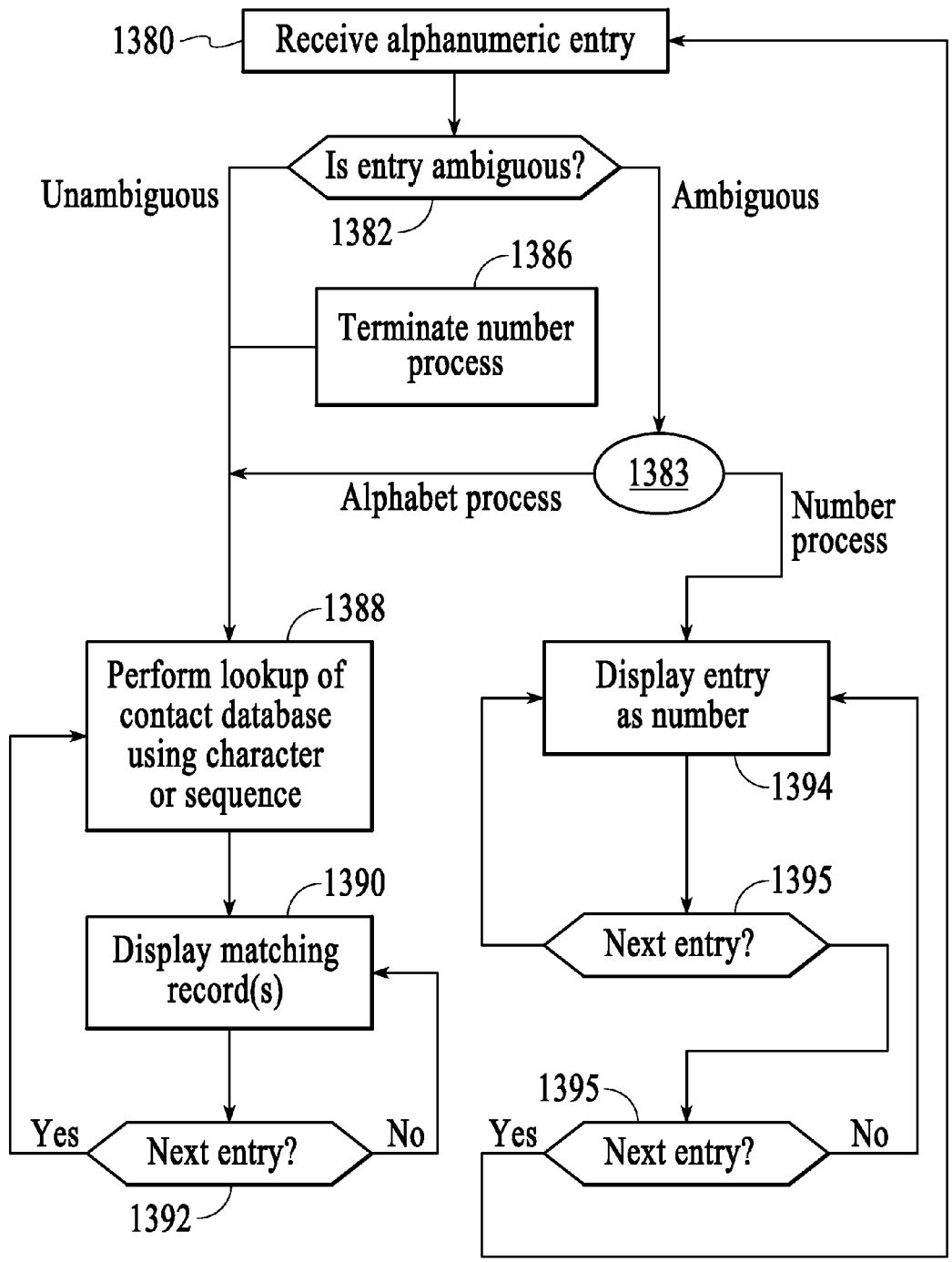
FIG. 13B illustrates a method for handling ambiguous key entries in connection with performing a lookup of a contact record and/or dialing a phone number, under an embodiment of the invention.

FIG. 13B illustrates a method for handling ambiguous key entries in connection with performing a lookup of a contact record and/or dialing a phone number, under an embodiment of the invention. As mentioned, certain keys on a keyboard of a computing device may have a number value or character value when actuated, depending on the context.

In one embodiment, the contact lookup feature may be implemented in connection with an application for enabling a person to place phone calls. For example, the contact lookup feature may be provided as a semi-persistent feature (e.g. present unless the user elects otherwise) that is present when the application for enabling a person to make phone calls is opened or in operation. As such, computer-implemented decisions may be needed as to how an entry with an ambiguous value of number or alphabet character is to be treated.

In step 1380, an alphanumeric entry is received by the computing device when such input can be used by either the phone application (the application for enabling the person to make calls) or the lookup feature. As will be described, whether a particular value has a number or character value may be based on which application the user wishes to handle the entry. For example, the user may intend a number entry when using the phone application, or a letter entry when the intent is to use the lookup feature.

In step 1382, a decision is made as to whether the entry is ambiguous. An ambiguous entry may have either numerical or alphabet values, depending on what application the user wishes to consume the entry. For example, in one implementation, ten keys on a QWERTY style keyboard can be interpreted as character or number, depending on the context that is intended. If the determination is that the key entry is ambiguous (i.e. one of the characters that has number and alphabet values), then the method proceeds to a juncture 1383. At juncture 1383, an embodiment provides that two processes are performed concurrently: an alphabetical lookup of the contact database, or a numerical display of a number sequence. Otherwise, if the entry is unambiguous, the process that is performed is the alphabet lookup process, since in the implementation being described, only alphabetical keys are unambiguous.

A process for the alphabetical lookup of the contact database is performed as follows. In step 1388, a character (if only one entry) or sequence of characters (if more than one entry) is used to perform a lookup of the contact database. In step 1390, the matching records of the contact database are displayed. In one embodiment, the display of the matching contact records is ongoing. In step 1392, a determination is made as to whether another entry is made for the sequence. Thus, if another character is entered, the process returns to step 1388. The result is that after each character, all matching records are shown. Any lookup algorithm, including one described by this application may be used. With each entry, the number of matching records is dwindled. The lookup process ends in when the user stops entering entries, and all matching records are displayed in step 1390. At that point, the record or records that match the sequence of entries are displayed at one time on the display of the computing device.

From juncture 1383, an embodiment provides that both the alphabetical lookup of the contact database process and a number/sequence display process is performed concurrently. Accordingly, from juncture 1383, an embodiment provides that steps 1388-1392 are performed, as well as the following: in step 1394, number values for an ambiguous key entry is displayed. In step 1395, a determination is made as to whether there is another entry. If there is no other entry, then the number or sequence of number (if there has been more than one entry) is displayed from step 1394. There may be a concurrent match of contact records from the alphabet contact lookup process. If there is another entry, a determination is made again as to whether the entry is ambiguous. As such, the method returns to step 1382 and juncture 1383. If an unambiguous key is entered after an ambiguous key, following step 1385, the number process is terminated in step 1386. The only process in effect is then the contact lookup process, using the assumption that all entries entered up until that point are to have alphabetical values. Otherwise, if successive entries are made so that the number process is not terminated, the user can, once all the needed numbers are entered, cause the number to be dialed by a subsequent action.

Figure 13C:
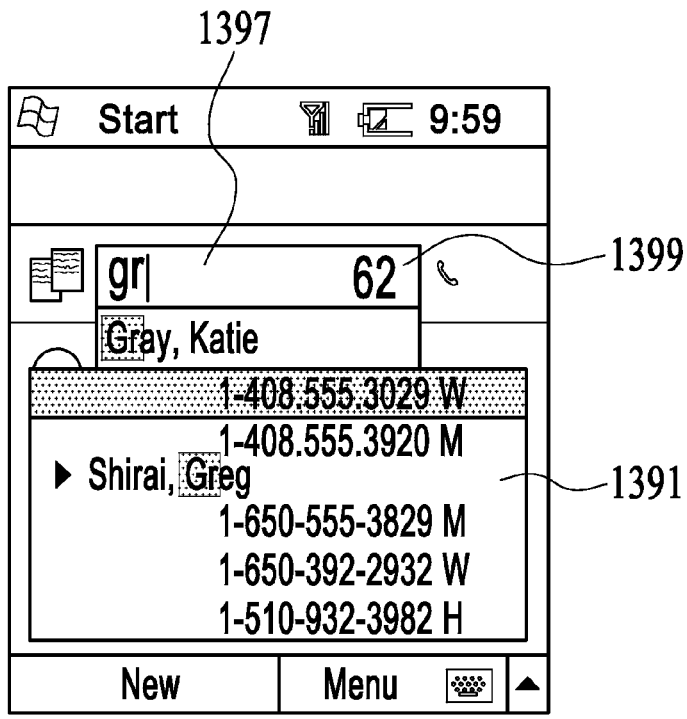
FIG. 13C illustrates an implementation of an embodiment such as described with a method of FIG. 13B.

FIG. 13C illustrates an implementation of an embodiment such as described with a method of FIG. 13B. In FIG. 13B, a screen display is shown comprising a lookup feature 1397 and a dialer for a phone application. In one implementation, the lookup feature 1397 is implemented as a plug-in to another application, such as a Home View application that displays interfaces to multiple applications. A plug-in may correspond to a program or sequence of code embedded in another program. In an example provided by FIG. 13C, a user has entered two entries: G/6 and R/2. On one interface (e.g. pop-up view 1391), contact records matching the two alphabet entries of "GR" are displayed, using an algorithm such as described above. At the same time, the number value sequence 1399 corresponding to "62" is displayed on the right side of the lookup feature 1399. If the user submits a dial action, the number entry may be used. If the user selects a matching contact record, then that contact record may be opened or used to perform some other operation. If the user enters a unambiguous entry following G/6, R/2, then the number sequence 1399 disappears and the contact lookup is the only application processing the key entries as input.

As described above, the contact lookup feature may be implemented as a plug-in, meaning it is embedded and operated in connection with another application. As such, multiple applications may be operating at one time from one display screen on a computing device. As such, more than one protocol or process may be needed to determine which application that is operating or operable from one display screen is to receive an input. For example, a protocol may be established that a key entry is to go to the lookup feature or number dialer, as described in FIG. 13B, unless the key entry qualifies as a press and hold (e.g. held for a second). In such a case, the press and hold may be interpreted as a "quick action" key press, such as speed dial, causing the computing device to perform one or more operations previously associated with that particular input.

Another protocol may be implemented that designates any input that can be interpreted as a number (e.g. one of the ambiguous keys in FIG. 13B) is interpreted as a number when a call is in progress. As such, the selection of that key causes a DTMF signal. An implementation provides that some user-interface mechanism is provided to enable the user to switch out of this default state. For example, when the user is on a call, the user may have the ability to select which application, plug-in or view is to receive an entry, including the ability to switch out of the DTMF-first consumption of an ambiguous key entry.

Active Call View

The final main user interface view of the telephone application is the active call user interface view. The active call user interface view is only available when there is an active incoming or outgoing telephone call. The contents of active call user interface screen will be dependent upon the telephone call (incoming or outgoing) and the particular abilities of the carrier network.

In an embodiment, the active call user interface view will allow the user to easily access various advanced telephone features. For example, the user may place a call on hold, initiate a three-way call, hang-up the call, enter the extra digits associated with an outgoing call, or turn on/off a speakerphone feature.

Figure 14:
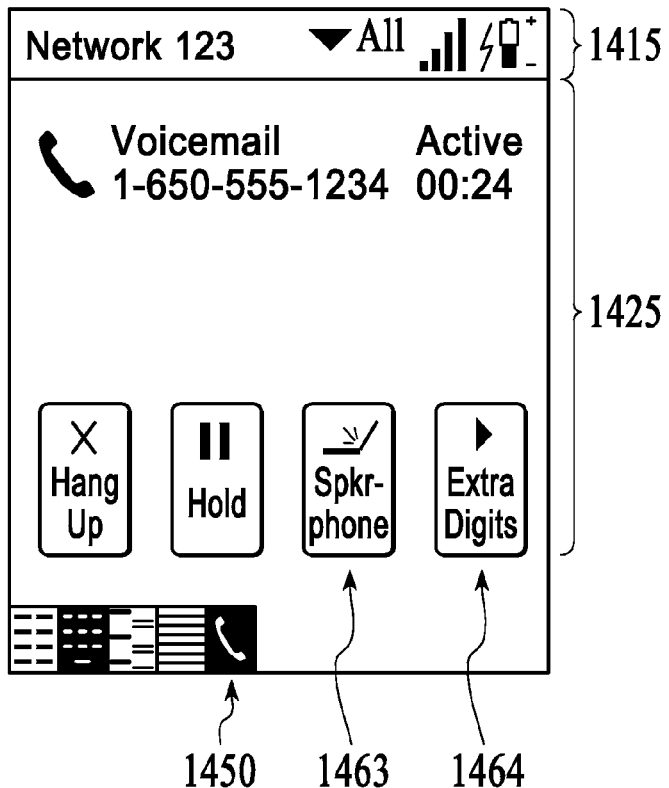
FIG. 14 illustrates a first view of a display arrangement for a telephone active call user interface view.

FIG. 14 illustrates one embodiment of an active call user interface view for an outgoing call to a voicemail system. The active call user interface view may include a title bar 1415, a view area 1425, and an active call view button 1450. Similar to the active call view button 550, the active call view button 1450 may be used by the user to access the active call view. In an implementation shown, the active call view button 1450 is present only when there is an active telephone call. To enter a DTMF account code or password for the voicemail system, the user can select the "extra digits" button 1464 to play the extra DTMF codes entered in the "extra digits" field of the speed dial record. The user may turn on a speakerphone feature by pressing "speakerphone" button 1463.

Figure 15:
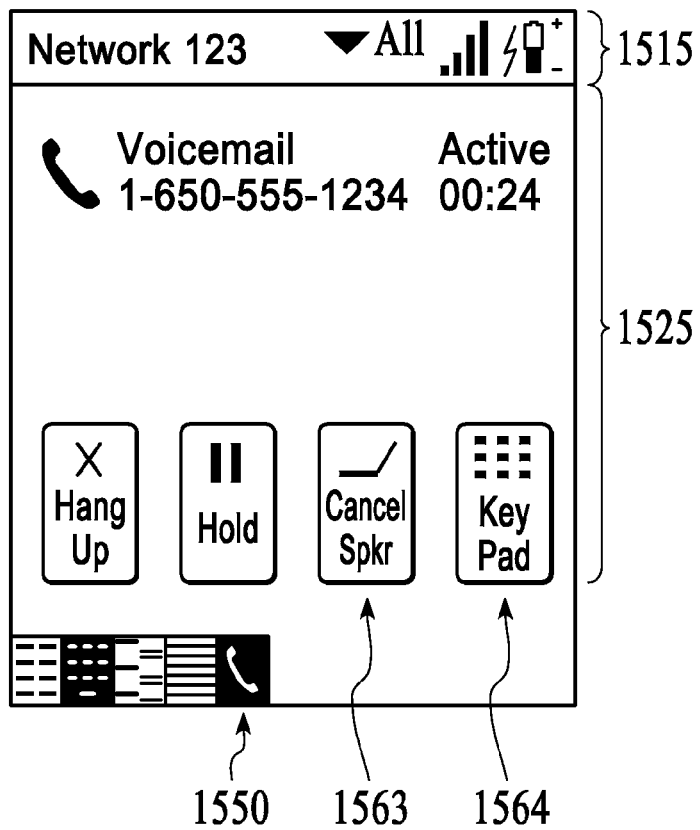
FIG. 15 illustrates a second view of a display arrangement for a telephone active call user interface view.

FIG. 15 illustrates another active call user interface view. The active call user interface view of FIG. 15 may include a title bar 1515, a view area 1525, and an active call view button 1550. In the active call user interface view of FIG. 15, the speakerphone is active such that the speakerphone button has been replaced with a "cancel speakerphone" button 1563. If the call was initiated using a means other than a speed dial button associated with a speed dial record with a set of "extra digits" then the active call screen will provide a key pad button 1564 that can be used to access the dial pad view such that the user may enter DTMF touch tones. If the hardware embodiment includes a keyboard with a dial pad area 391 as illustrated in FIG. 3C, then the user may simply enter DTMF touch tones by tapping the number keys in the dial pad area 391 or other keys associated with DTMF dial tones such as #, *, and +.

Telephone Application Alerts

Certain events cause special alert pages to be displayed by the telephone application page. For example, when an incoming call is received, the user is presented with an incoming call alert screen.

Figure 16:
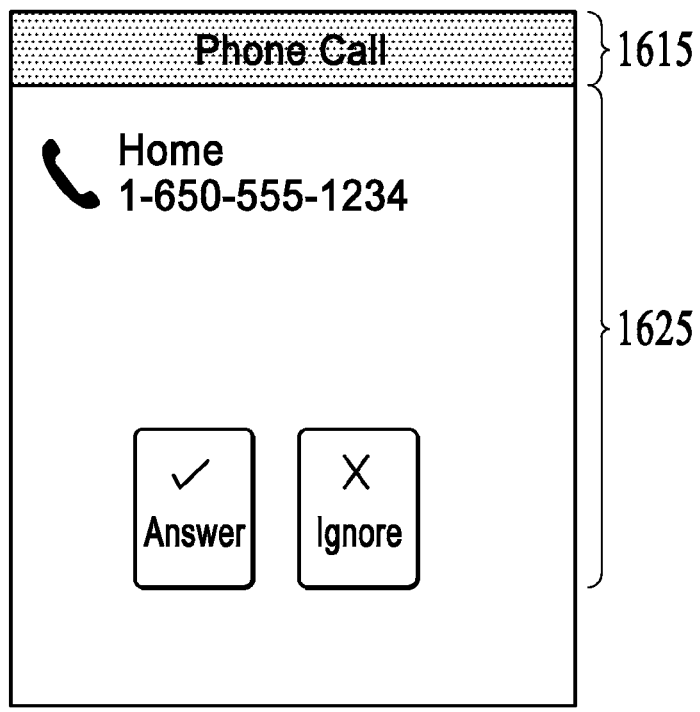
FIG. 16 illustrates an alert screen that may be display when an incoming call is received and the lid of the telephone is open.

FIG. 16 illustrates a first embodiment of an incoming call alert screen view that informs the user of an incoming call. The first embodiment of the incoming call alert screen view may include a title bar 1615 and a view area 1625. At the top of the screen display is a message generated by a caller-id feature that specifies the telephone number of the incoming call (if available). If the incoming telephone number exists in the contact database, then the label associated with the telephone number is displayed, in this case the label "Home" is displayed. The embodiment of an incoming call screen is illustrated in FIG. 16 is delivered when the flip lid 320 of the integrated computer and cellular telephone system illustrated in FIG. 3A is open. The user may answer or ignore the incoming telephone call by touching either "Answer" or "Ignore" buttons respectively.

Figure 17:
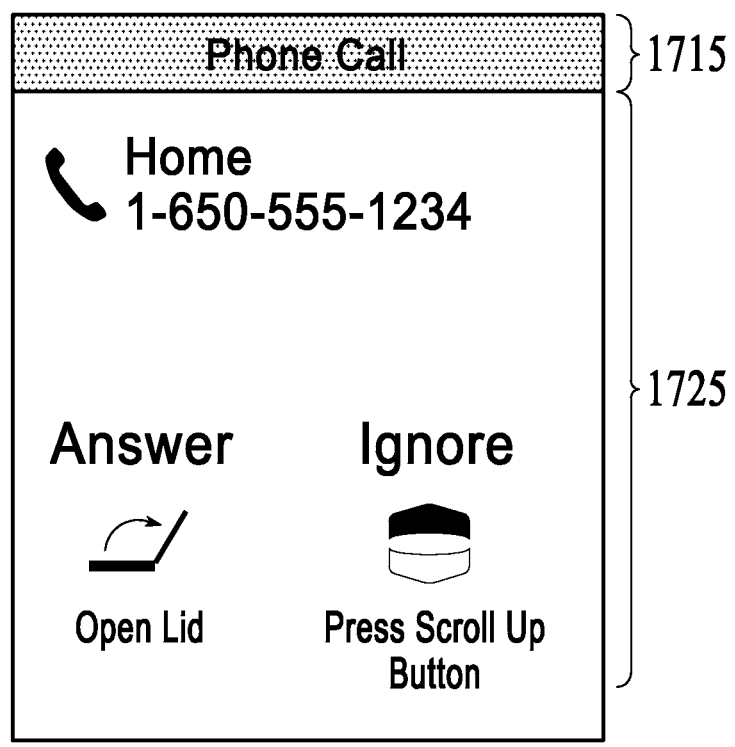
FIG. 17 illustrates an alert screen that may be display when an incoming call is received and the lid of the telephone is closed.

FIG. 17 illustrates a second embodiment of an incoming call alert screen view that informs the user of an incoming call. The second embodiment of the incoming call alert screen view may include a title bar 1715 and a view area 1725. The embodiment of an incoming call screen is illustrated in FIG. 17 is delivered when the flip lid 320 of the integrated computer and cellular telephone system illustrated in FIG. 3A is closed. The user may answer the incoming telephone call opening the lid 320 of the integrated computer and cellular telephone system. Similarly, the user may ignore the telephone call (and thus stop the ringing) by tapping the upward scroll button.

If an incoming telephone call is received while the user is opening or closing the flip lid 320 or presses a button on the integrated computer and cellular telephone system, an undesirable action may occur. For example, if the user is opening the flip lid 320 while an incoming call is being received, then the user may inadvertently answer the telephone call without having a chance to review the caller-ID field. Similarly, a user may pressing the scroll up button just when an incoming call is and the lid is closed, this might cause the integrated computer and cellular telephone system to ignore the incoming call before the user even knew an incoming call was being received.

To prevent such undesirable effects, one embodiment of the present invention uses an input "lockout period". Specifically, one embodiment ignores all input events (such as lid opening event or a key press event) for a predefined period when an incoming call is received. Thus, if an incoming telephone call is received while a user is opening the lid, the opening of the lid will not cause the integrated computer and cellular telephone system to answer the telephone call. Instead, the system will display the interface of FIG. 16. Similarly, if the user presses the upward scroll button when an incoming call is received and the lid is closed, the button press will not ignore the telephone call. In one embodiment, the lock out period is half a second. However, it may be adjusted to a longer or shorter period of time.

Voicemail Control and Functionality

Embodiments described herein enable a computing device to be used for voicemail control and functionality. An example of a computing device that can be used with this section is a handheld computing system, such as described with previous embodiments. For example, a cellular telephone or smart phone (a phone and personal digital assistant (PDA) hybrid) are examples of devices that can implement embodiments such as described. With the advance of Internet telephony, however, embodiments such as described may apply to other forms of telecommunications such as Internet Telephony.

Figure 18A:
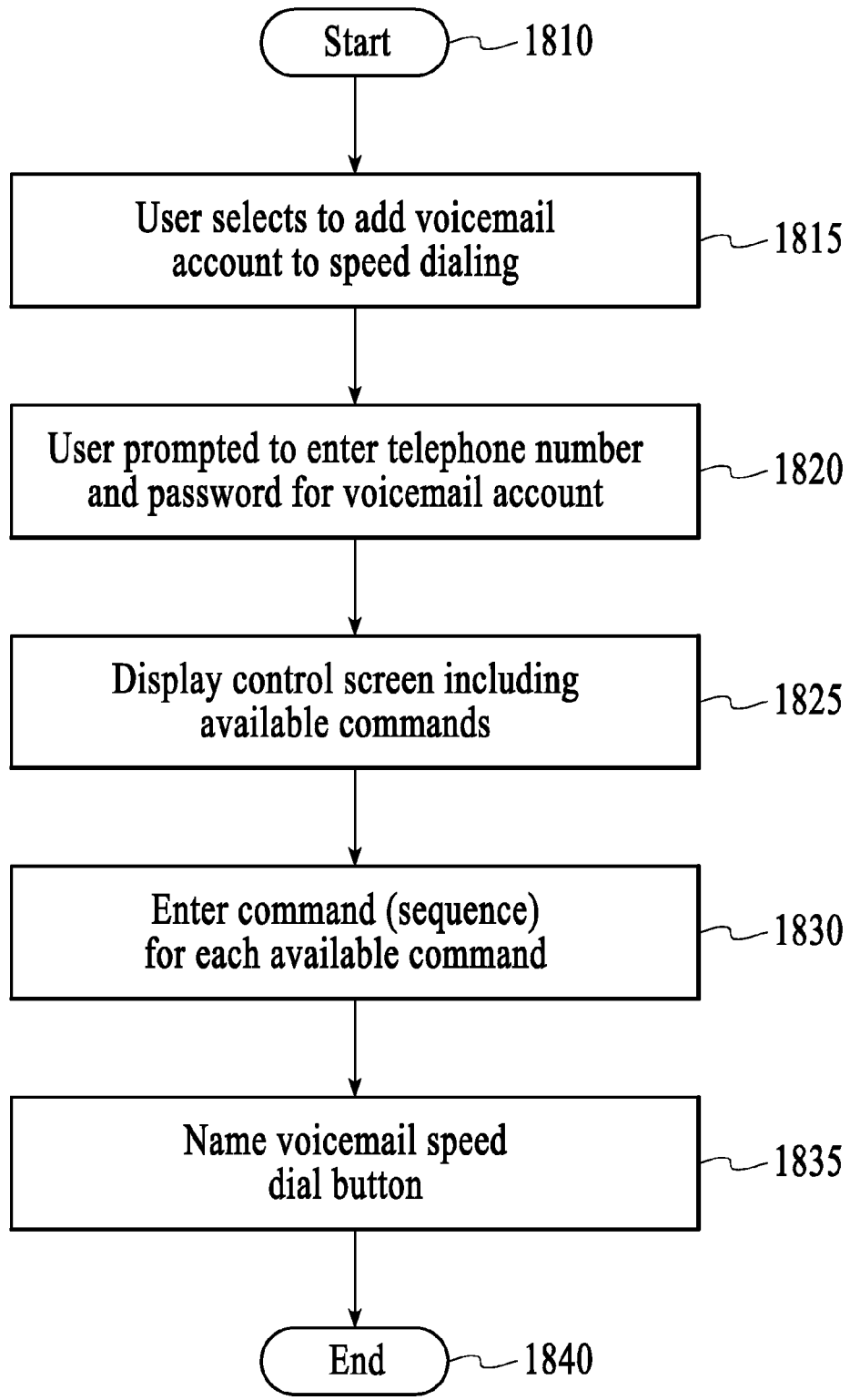
FIG. 18A describes a flowchart showing one embodiment of adding a voice mailbox to the speed dial of the system for voicemail access.

FIG. 18A describes a flowchart showing one embodiment of adding a voice mailbox to the speed dial of the system for voicemail access. The process starts at block 1810.

In step 1815, the user selects to add a new voicemail account to the speed dialing list. In one implementation, voicemail programmed speed dial buttons are treated differently from other speed dial buttons. For example, the particular speed dial action that causes the computing device to access the voicemail may be designated by a wireless carrier or other third party.

In step 1820, the user is prompted to enter the telephone number and/or password for the voicemail account. In one implementation, a speed dial record is created from the user entering a sequence of numbers/characters. The sequence of number/characters specify (i) voicemail speed dial telephone number, (ii) a number or character that indicates a pause (e.g. "one second pause"), and (iii) a sub-sequence of numbers that signal the password. For the pause, the computing device may play no DTMF tone, while for the password, the DTMF tones for the sequence of numbers are played over the telephone connection. In another implementation, when the user first pushes the voicemail button, the telephone number is dialed, and when the user pushes the voicemail button for a second time, the password is dialed. Both of these numbers are entered at this stage.

Step 1825 provides that command translation is established, to enable the user to correlate user-interface function of the computing device with numbers (actually DTMF tones) of a specific voicemail system that perform commands based on the user entering those numbers. Accordingly, in step 1825, a control screen is displayed. The control screen includes each of the commands that are generally available in a voicemail system, such as previous message, next message, back, skip message, delete message, forward message, back to the beginning, reply to message, etc. For one embodiment, a subset of these commands may be made available. For another embodiment, the user may alter this listing, and may create new commands.

In step 1830, the user is prompted to enter a command or command sequence for each of the commands that are available in the voicemail system. For example, in a voicemail system, pressing the "3" key may mean "delete message." The user can enter the number "3" underneath the command key, to program the command. In other systems, the pressing the "7" key twice may be the code to "delete message." The user can enter whatever key combination works for the specific voicemail system.

At step 1835, after the user finishes programming the voicemail system, the user is prompted to name the speed dial button. For one embodiment, the default name is "voicemail." However, users may have multiple voicemail accounts, and may wish to have more descriptive names.

Figure 18B:
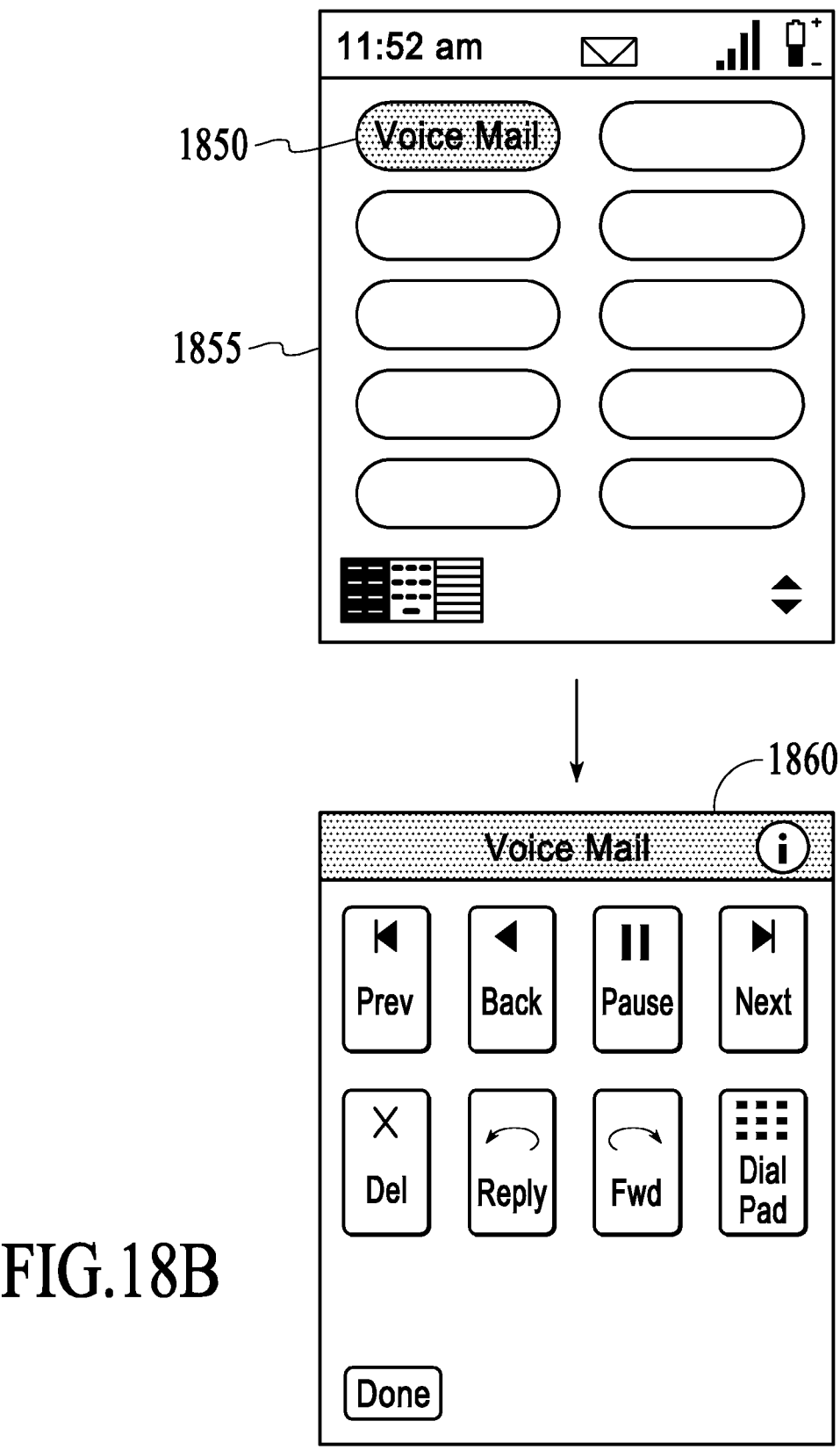
FIG. 18B shows one embodiment of screen shots for voicemail control.

Step 1840 provides that the process ends. The programming of the voicemail access is now complete, and the user can access the voicemail system by pressing the speed dial button. FIG. 18B shows one embodiment of screen shots for voicemail control. The voicemail button 1850 is shown on speed dialing screen 1855. When the user selects the voicemail button 1850, the voicemail number programmed in by the user is dialed. For one embodiment, the dialing screen is shown (see screen 820). When the call connects the voicemail control screen 1860 is displayed. The voicemail control screen 1860 includes the controls available for the voicemail system. Control screen 1860 is an exemplary screen, showing the controls: (previous message), back (to the beginning of the message), pause, next (message), (delete message), reply (to message), forward (message), and dial pad, for entering additional commands. Other layouts or sets of commands may be used. However, using this type of voicemail control screen 1860 for all voicemail applications simplifies access to multiple voicemail accounts.

Figure 19:
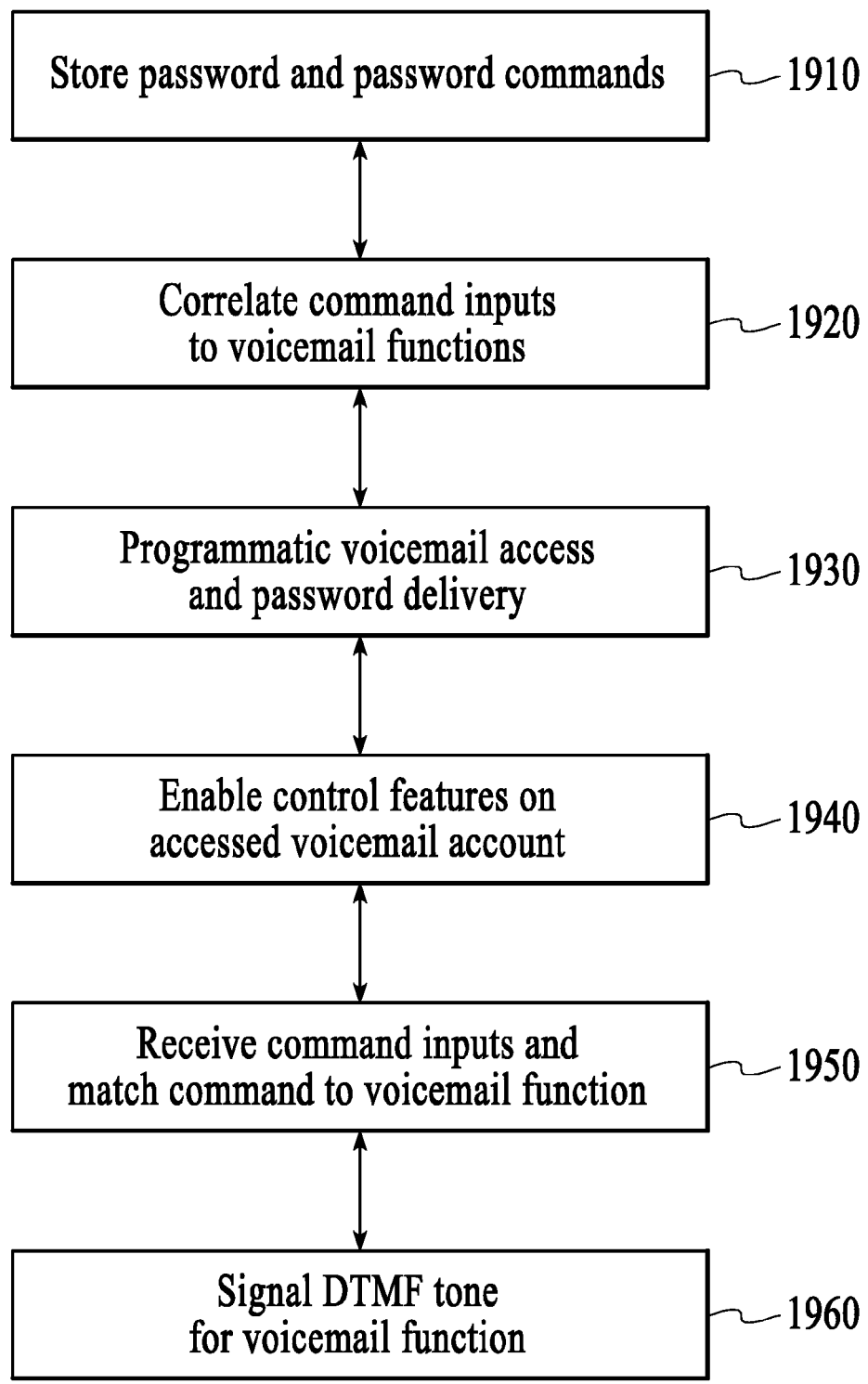
FIG. 19 illustrates another method describing establishment and use of a voicemail control feature for a computing device, under an embodiment of the invention.

FIG. 19 illustrates another method describing establishment and use of a voicemail control feature for a computing device, under an embodiment of the invention. In step 1910, a computing device is configured to store password and optionally, password commands for voicemail access on a telephony computing device. In an embodiment such as provided, the password may be stored with the voicemail number as one sequential numeric entry. This entry may form a single speed dial or quick action command. An example of a password command may include a user dialing a voicemail service general number, then having to make a another selection or input to have the voicemail system route his access and retrieval card to a specific account.

Step 1920 provides that command inputs that can be made by a user during a voicemail access call or correlated to voicemail functions of a particular voicemail service. Basic examples of command inputs include designated input commands (e.g. displayed soft keys and are hardware/button inputs) that are to mean a specific command that the voicemail system can understand and process (e.g. "save message" "forward message" "skip message" exit voicemail" "delete message"). In one implementation, step 1920 is performed by a user of the device, and the voicemail service is configured for one that the user selects. In another implementation, the voicemail service is pre-determined on the computing device.

As an option, step 1930 provides that a programmatic voicemail access and password delivery is performed from the computing device to a voicemail system of the user. The programmatic access and password delivery means that at least some of the steps needed to access a user's voicemail box are performed programmatically, including the transmission of DTMF tones corresponding to password and password commands for accessing the desired voicemail box.

Figure 21:
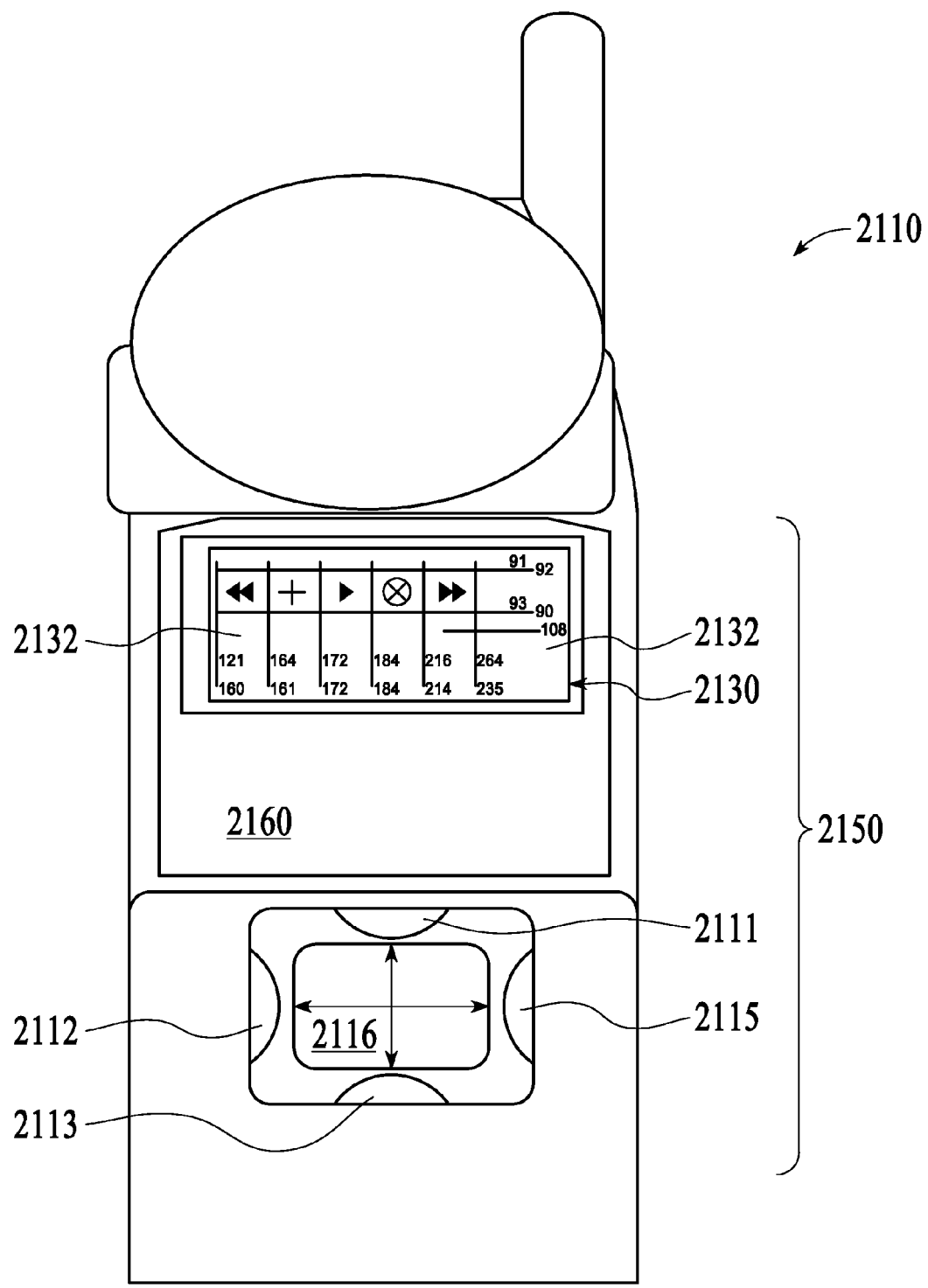
FIG. 21 illustrates an embodiment implemented on a computing device 2110 in which the commands inputs for the voicemail system are entered and processed through a multi-dimensional mechanical input mechanism 2150.

In step 1940, control features for use with the accessed voicemail account are enabled on the computing device. In an embodiment such as shown in FIG. 21, this may correspond to displaying a set of voicemail functions and enabling the user to operate a mechanical or computer-generated input mechanism to make command selections.

Once voicemail access is achieved, step 1950 provides that a user's command input(s) is received and matched to specified functions of the voicemail system. These commands are received by the user entering input correlated to those commands, as established in step 1920.

In step 1960, the commands selected by the user are translated into DTMF signals that are recognized and processed by the voicemail system.

Figure 20:
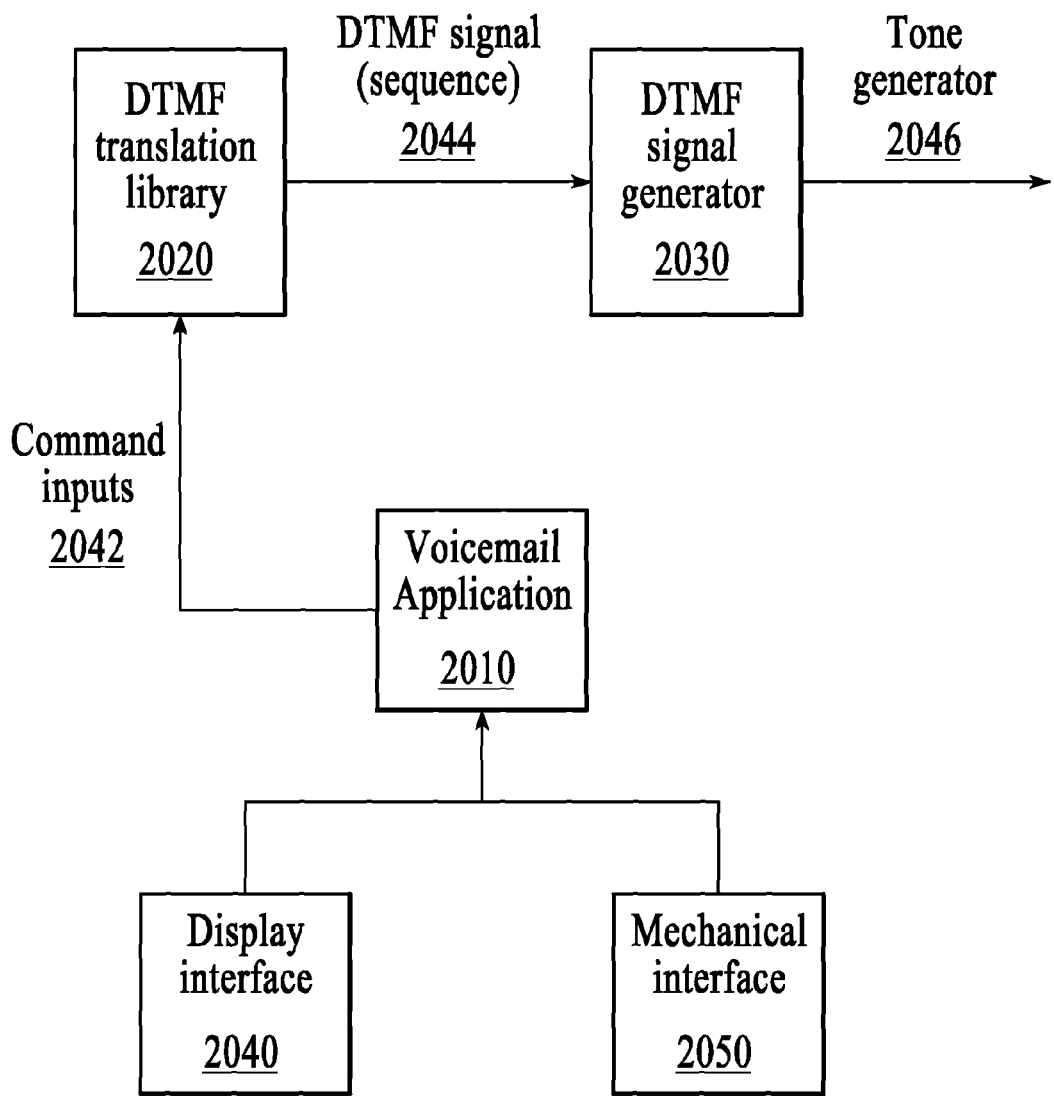
FIG. 20 illustrates a system for enabling establishment and use of a voicemail control feature for a computing device, under an embodiment of the invention.

FIG. 20 illustrates a system for enabling establishment and use of a voicemail control feature for a computing device, under an embodiment of the invention. The voicemail system includes a voicemail application 2010, a DTMF translation library 2020, and a DTMF signal generator. The voicemail application 2010 may correspond to plug-in (embedded application) or resident application that executes and enables the user to enter pre-configured command inputs.

Additionally, the voicemail application 2010 may be operable by the user to establish the voicemail command features, including access to a voicemail box and configuring inputs on the computing device to translate commands that can be handled by the voicemail system. For example, the voicemail application 2010 may be operated in a set-up phase to enable the user to perform one or more of the following: (i) dial voicemail; (ii) enter password and pause or other commands; and (iii) enable and/or configure command inputs from user. Subsequently, during an operational, the voicemail application may automate many of the functions normally needed to be performed manually by the user, including one or more of the following: (i) dial some or all numbers of voicemail; and (ii) enter numbers for voicemail passcode.

According to an embodiment, one or more user-interfaces are provided to enable the user to operate the voicemail application 2010 in the set-up phase and in the operational phase. A display interface 2040 and mechanical interface 2050 may individually or jointly combine to enable the user to use the voicemail application in one or both of the setup or operational phase. In one implementation, the display interface 2040 may be used to at least prompt the user into entering an input (perhaps through some other user-interface, such as the mechanical interface 2050). The mechanical interface 2050 may correspond to keys or buttons (such as keys or buttons of a keyboard or of one or more application/specialized buttons), to a multi-directional member (e.g. joystick or pad) or other form of device for entering input.

In the operational phase, the display interface 2040 and/or mechanical interface may be used to enable the user to specify command inputs 2042 from the voicemail system. The command inputs may be received and processed by DTMF translation library 2020, which converts one or more command inputs into a DTMF identifier 2044 (or sequence). The DTMF generator 2030 may convert the DTMF identifier(s) 2044 into DTMF tones 2046 that are recognized as commands (e.g. "play "delete" etc.) by the voicemail system.

FIG. 21 illustrates an embodiment implemented on a computing device 2110 in which the commands inputs for the voicemail system are entered and processed through a multi-dimensional mechanical input mechanism 2150. An example of a multi-dimensional input mechanism is a mechanism, or set of mechanisms that are coordinated, to provide inputs such as directional and selection inputs. In one embodiment, the inputs are entered in connection with display prompts provided by a displayed interface 2130 on a display 2160. The displayed interface 2130 includes visual indications 2132 that indicate what and how the multi-dimensional mechanical input mechanism may be operated in order to generate a corresponding command input. In one embodiment, the display 2160 is contact-sensitive, so that the visual indications 2132 of the displayed interface 2130 are selectable.

In one embodiment, multi-dimensional mechanical input mechanism 2150 is a five-way button or key set. The input mechanism 2150 may be actuated in any one of four directions (with respect to FIG. 21, north direction 2111, south direction 2113, east direction 2115 and west direction 2112). In addition, the input mechanism 2110 may have a center selection key 2116. In an embodiment shown, the input mechanism 2110 includes is operable by a single thumb or of the user. The user can enter directional navigational input by steering his thumb in the direction of the desired navigation. Furthermore, the user can signal selection by pressing the center selection key 2116. U.S. patent application Ser. No. 10/775,472 (filed Feb. 9, 2004, and hereby incorporated by reference), U.S. Provisional Patent Application Ser. No. 60/455,178 (filed Mar. 16, 2003 and hereby incorporated by reference), and U.S. Provisional Patent Application Ser. No. 60/479,392 (filed Jun. 17, 2003 and hereby incorporated by reference) each describe an input mechanism for use with an embodiment such as described.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method comprising:
providing an interface for enabling a voicemail system to be controlled from a handheld computing device on a contact-sensitive display for the handheld computing device, the interface enabling selection by a user of any one of a plurality of command inputs, the interface including a module enabled to automatically provide a user password stored on the handheld computing device to the voicemail system;
assigning the plurality of command inputs to a plurality of display objects displayed in the interface;
correlating one or more of the plurality of display objects with one or more respective keys of the handheld computing device, such that the one or more display objects may be selected by pressing the one or more respective keys with which they are correlated;
detecting a first selection of a first display object of the plurality of display objects;
in response to the first selection of the first display object, generating a first signal tone to connect across a network to the voicemail system;
detecting a second selection of the first display object;
in response to the second selection of the first display object, generating a second signal tone to communicate the user password to the voicemail system.

2. The method of claim 1, wherein providing an interface includes providing a mechanical interface.

3. The method of claim 2, wherein providing the mechanical interface includes coordinating operation of the mechanical interface with selection of one or more of the plurality of display objects.

4. The method of claim 2, wherein providing the mechanical interface includes coordinating an operation of a multi-dimensional input mechanism with selection of one or more of the plurality of display objects.

5. The method of claim 4, wherein coordinating the operation of the multi-dimensional input mechanism with the selection of the one or more of the plurality of display objects includes coordinating a directional input and a selection input made through operation of the multi-dimensional input mechanism.

6. The method of claim 1, further comprising:
in response to completing a connection to the voicemail system, automatically displaying a plurality of controls available for the voicemail system.

7. The method of claim 6, wherein the plurality of controls available for the voicemail system are selected from a group consisting of: saving a message, playing a message, forwarding a message, deleting a message, and skipping a message.

8. The method of claim 1, wherein the plurality of display objects comprises a plurality of speed dial buttons.

9. The method of claim 1, wherein the network is a cellular telephone network.

10. The method of claim 1, wherein the network uses an Internet Protocol.

11. A non-transitory computer-readable medium storing instructions, the instructions executable by a processor to:
provide an interface for controlling a voicemail system via a contact-sensitive display of a handheld computing device, the interface enabling selection of any one of a plurality of command inputs, the interface including a module to automatically provide a user password stored on the handheld computing device to the voicemail system;
assign the plurality of command inputs to a plurality of display objects displayed in the interface;
correlate one or more of the plurality of display objects with one or more respective keys of the handheld computing device, wherein the one or more display objects can be selected by pressing the one or more respective keys with which they are correlated;
detect a first selection of a first display object of the plurality of display objects;
in response to the first selection of the first display object, generate a first signal tone to connect across a network to the voicemail system;
detect a second selection of the first display object;
in response to the second selection of the first display object, generate a second signal tone to communicate the user password to the voicemail system.

12. The non-transitory computer-readable medium of claim 11, the instructions further executable to:
coordinate operation of the interface with selection of one or more of the plurality of display objects.

13. The non-transitory computer-readable medium of claim 11, the instructions further executable to:
coordinate an operation of a multi-dimensional input mechanism with selection of one or more of the plurality of display objects.

14. The non-transitory computer-readable medium of claim 13, the instructions further executable to:
coordinate a directional input and a selection input made through operation of the multi-dimensional input mechanism.

15. The non-transitory computer-readable medium of claim 11, wherein the network is a cellular telephone network.

16. A handheld computing device comprising:
a display screen;
a processor; and
a storage device including instructions executable by the processor to:
provide an interface for controlling a voicemail system via the display screen, the interface enabling selection of any one of a plurality of command inputs, the interface including a module to automatically provide a user password stored on the storage device to the voicemail system;
assign the plurality of command inputs to a plurality of display objects included in the interface;
correlate one or more of the plurality of display objects with one or more respective keys of the handheld computing device, wherein the one or more display objects can be selected by pressing the one or more respective keys with which they are correlated;
detect a first selection of a first display object of the plurality of display objects;
in response to the first selection of the first display object, generate a first signal tone to connect across a network to the voicemail system;
detect a second selection of the first display object;
in response to the second selection of the first display object, generate a second signal tone to communicate the user password to the voicemail system.

17. The handheld computing device of claim 16, the instructions further executable to:
coordinate operation of the interface with selection of one or more of the plurality of display objects.

18. The handheld computing device of claim 16, the instructions further executable to:
    coordinate an operation of a multi-dimensional input mechanism of the handheld computing device with selection of one or more of the plurality of display objects.

19. The handheld computing device of claim 18, the instructions further executable to:
    coordinate a directional input and a selection input made through operation of the multi-dimensional input mechanism.

20. The handheld computing device of claim 16, wherein the network is a cellular telephone network.

\* \* \* \* \*